(12) United States Patent
Thomson et al.

(10) Patent No.: US 9,104,411 B2
(45) Date of Patent: *Aug. 11, 2015

(54) SYSTEM AND METHOD FOR CONTROLLING CENTRAL PROCESSING UNIT POWER WITH GUARANTEED TRANSIENT DEADLINES

(71) Applicant: QUALCOMM Incorporated, San Diego, CA (US)

(72) Inventors: Steven S. Thomson, San Diego, CA (US); Bohuslav Rychlik, San Diego, CA (US); Ali Iranli, San Diego, CA (US); Sumit Sur, Boulder, CO (US); Norman Scott Gargash, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 290 days.

This patent is subject to a terminal disclaimer.

(21) Appl. No.: 13/669,043

(22) Filed: Nov. 5, 2012

(65) Prior Publication Data
US 2013/0074085 A1 Mar. 21, 2013

Related U.S. Application Data

(63) Continuation-in-part of application No. 12/944,467, filed on Nov. 11, 2010, now Pat. No. 8,909,962.

(60) Provisional application No. 61/286,991, filed on Dec. 16, 2009.

(51) Int. Cl.
*G06F 1/00* (2006.01)
*G06F 1/32* (2006.01)
(Continued)

(52) U.S. Cl.
CPC .............. *G06F 1/3203* (2013.01); *G06F 1/324* (2013.01); *G06F 1/3296* (2013.01); *G06F 1/26* (2013.01);
(Continued)

(58) Field of Classification Search
CPC ........................................................ G06F 1/32
USPC ........................................................ 713/323
See application file for complete search history.

(56) References Cited

U.S. PATENT DOCUMENTS

| 4,601,008 A | 7/1986 | Kato |
| 5,644,769 A | 7/1997 | Hasiguti |

(Continued)

FOREIGN PATENT DOCUMENTS

| CN | 1678971 A | 10/2005 |
| CN | 1692326 A | 11/2005 |

(Continued)

OTHER PUBLICATIONS

Compaq et al, "Advanced Configuration and Power Interface Specification", Compaq Computer Corporation, Intel CorOporation, Microsoft Corporation, Phoenix Technologies Ltd., Toshiba Corporation, Revision 2.0, Jul. 27, 2000.

(Continued)

*Primary Examiner* — Jaweed A Abbaszadeh
*Assistant Examiner* — Austin Hicks
(74) *Attorney, Agent, or Firm* — Nicholas A. Cole

(57) ABSTRACT

Methods, systems and devices that include a dynamic clock and voltage scaling (DCVS) solution configured to compute and enforce performance guarantees to ensure that a processor does not remain in a busy state (e.g., due to transient workloads) for more than a predetermined amount of time above that which is required for that processor to complete its pre-computed steady state workload. The DCVS may adjust the frequency and/or voltage of a processor based on a variable delay to ensure that the processing core only falls behind its steady state workload by, at most, a predefined maximum amount of work, irrespective of the operating frequency or voltage of the processor.

40 Claims, 16 Drawing Sheets

(51) Int. Cl.
G06F 1/26 (2006.01)
G06F 9/50 (2006.01)

(52) U.S. Cl.
CPC ............... *G06F 1/32* (2013.01); *G06F 9/5094* (2013.01); *Y02B 60/1217* (2013.01); *Y02B 60/1285* (2013.01)

(56) References Cited

U.S. PATENT DOCUMENTS

| | | |
|---|---|---|
| 6,073,244 A | 6/2000 | Iwazaki |
| 6,076,171 A | 6/2000 | Kawata |
| 6,804,632 B2 | 10/2004 | Orenstien et al. |
| 6,829,713 B2 | 12/2004 | Cooper et al. |
| 6,978,389 B2 | 12/2005 | Jahnke |
| 7,043,405 B2 | 5/2006 | Orenstien et al. |
| 7,058,824 B2 | 6/2006 | Plante et al. |
| 7,107,187 B1 | 9/2006 | Saghier et al. |
| 7,133,806 B2 | 11/2006 | Prasad |
| 7,134,031 B2 | 11/2006 | Flautner |
| 7,219,245 B1 | 5/2007 | Raghuvanshi |
| 7,233,188 B1 | 6/2007 | Takano et al. |
| 7,263,457 B2 | 8/2007 | White et al. |
| 7,346,787 B2 | 3/2008 | Vaidya et al. |
| 7,369,967 B1 | 5/2008 | Washburn et al. |
| 7,370,189 B2 | 5/2008 | Fischer et al. |
| 7,398,407 B2 | 7/2008 | Jorgenson et al. |
| 7,401,240 B2 | 7/2008 | Heller, Jr. et al. |
| 7,437,581 B2 | 10/2008 | Grochowski et al. |
| 7,467,291 B1 | 12/2008 | Cockroft et al. |
| 7,500,124 B2 | 3/2009 | Seo |
| 7,543,161 B2 | 6/2009 | Olszewski et al. |
| 7,650,527 B2 | 1/2010 | Rambo et al. |
| 7,669,067 B2 | 2/2010 | Degenhardt |
| 7,689,838 B2 | 3/2010 | Srinivasan et al. |
| 7,711,966 B2 | 5/2010 | Prabhakaran et al. |
| 7,761,874 B2 | 7/2010 | Bodas |
| 7,783,906 B2 | 8/2010 | Turner et al. |
| 7,849,349 B2 | 12/2010 | Tamlyn |
| 7,949,887 B2 | 5/2011 | Gunther et al. |
| 2002/0029353 A1 | 3/2002 | Hwang |
| 2002/0046354 A1 | 4/2002 | Ostrom et al. |
| 2002/0188877 A1 | 12/2002 | Buch |
| 2003/0115495 A1 | 6/2003 | Rawson, III |
| 2003/0177163 A1 | 9/2003 | Nomura |
| 2004/0225902 A1 | 11/2004 | Cesare et al. |
| 2004/0254765 A1 | 12/2004 | Lee et al. |
| 2005/0102560 A1 | 5/2005 | Taketoshi et al. |
| 2006/0036878 A1 | 2/2006 | Rothman et al. |
| 2006/0123253 A1 | 6/2006 | Morgan et al. |
| 2006/0149975 A1 | 7/2006 | Rotem et al. |
| 2007/0016815 A1 | 1/2007 | Cooper et al. |
| 2007/0033425 A1 | 2/2007 | Clark |
| 2007/0033526 A1 | 2/2007 | Thompson et al. |
| 2007/0061108 A1 | 3/2007 | DeWitt et al. |
| 2007/0255929 A1 | 11/2007 | Kasahara et al. |
| 2008/0005591 A1 | 1/2008 | Trautman et al. |
| 2008/0028244 A1 | 1/2008 | Capps et al. |
| 2008/0162965 A1 | 7/2008 | Marinas et al. |
| 2008/0168287 A1 | 7/2008 | Berry et al. |
| 2008/0201591 A1 | 8/2008 | Hu et al. |
| 2008/0310099 A1 | 12/2008 | Monferrer et al. |
| 2009/0037922 A1 | 2/2009 | Herington |
| 2009/0049314 A1 | 2/2009 | Taha et al. |
| 2009/0106576 A1 | 4/2009 | Jacobowitz et al. |
| 2009/0150695 A1 | 6/2009 | Song et al. |
| 2009/0150696 A1 | 6/2009 | Song et al. |
| 2009/0187775 A1 | 7/2009 | Ishikawa |
| 2009/0217276 A1 | 8/2009 | Brenner et al. |
| 2009/0230930 A1 | 9/2009 | Jain et al. |
| 2009/0249347 A1 | 10/2009 | Henmi |
| 2009/0271646 A1 | 10/2009 | Talwar et al. |
| 2009/0276642 A1 | 11/2009 | Burton et al. |
| 2010/0037038 A1 | 2/2010 | Bieswanger et al. |
| 2010/0076733 A1 | 3/2010 | Kumar et al. |
| 2010/0122101 A1 | 5/2010 | Naffziger et al. |
| 2010/0169609 A1 | 7/2010 | Finkelstein et al. |
| 2010/0299541 A1 | 11/2010 | Ishikawa et al. |
| 2011/0023047 A1 | 1/2011 | Memik et al. |
| 2011/0145559 A1 | 6/2011 | Thomson et al. |
| 2011/0145605 A1 | 6/2011 | Sur et al. |
| 2011/0145615 A1 | 6/2011 | Rychlik et al. |
| 2011/0145616 A1 | 6/2011 | Rychlik et al. |
| 2011/0145617 A1 | 6/2011 | Thomson et al. |
| 2011/0145624 A1 | 6/2011 | Rychlik et al. |
| 2011/0145824 A1 | 6/2011 | Thomson et al. |
| 2013/0151879 A1 | 6/2013 | Thomson et al. |
| 2014/0181542 A1 | 6/2014 | Sur et al. |

FOREIGN PATENT DOCUMENTS

| | | |
|---|---|---|
| CN | 101076770 A | 11/2007 |
| CN | 101111814 A | 1/2008 |
| CN | 101135928 A | 3/2008 |
| CN | 101211215 A | 7/2008 |
| CN | 101241390 A | 8/2008 |
| CN | 101351759 A | 1/2009 |
| CN | 101401056 A | 4/2009 |
| CN | 101403944 A | 4/2009 |
| CN | 101414268 A | 4/2009 |
| CN | 101436098 A | 5/2009 |
| EP | 0098169 A2 | 1/1984 |
| EP | 0942363 A2 | 9/1999 |
| EP | 1496424 A2 | 1/2005 |
| GB | 2445167 A | 7/2008 |
| JP | H0351902 A | 3/1991 |
| JP | 8006681 A | 1/1996 |
| JP | H08190535 A | 7/1996 |
| JP | H10268963 A | 10/1998 |
| JP | H11282695 A | 10/1999 |
| JP | 2002099433 A | 4/2002 |
| JP | 2004533674 A | 11/2004 |
| JP | 2005128937 A | 5/2005 |
| JP | 2006011548 A | 1/2006 |
| JP | 2008059054 A | 3/2008 |
| JP | 2008117397 A | 5/2008 |
| JP | 2008513912 A | 5/2008 |
| JP | 2008129846 A | 6/2008 |
| JP | 2008165798 A | 7/2008 |
| JP | 2008269249 A | 11/2008 |
| JP | 2009503728 A | 1/2009 |
| JP | 2009037335 A | 2/2009 |
| JP | 2009140157 A | 6/2009 |
| JP | 2009169858 A | 7/2009 |
| JP | 2009238024 A | 10/2009 |
| JP | 2010518525 A | 5/2010 |
| KR | 20070049226 A | 5/2007 |
| KR | 20090107490 A | 10/2009 |
| TW | 200907660 A | 2/2009 |
| WO | WO0225414 A2 | 3/2002 |
| WO | WO-02074046 A2 | 9/2002 |
| WO | WO-2004044720 A2 | 5/2004 |
| WO | WO2005119412 A1 | 12/2005 |
| WO | 2006037119 A2 | 4/2006 |
| WO | WO2007007300 A2 | 1/2007 |
| WO | WO-2007019003 A2 | 2/2007 |
| WO | WO2008047179 A1 | 4/2008 |

OTHER PUBLICATIONS iDebian, CPU frequency scaling in Linux, Jun. 26, 2008, iDebian's Weblog.

Stallings, W., "Operating systems internals and design principles," 2005, Pearson, 5th edition, section 3.2, pp. 111-126.

International Preliminary Report on Patentability—PCT/US2010/059535, The International Bureau of WIPO—Geneva, Switzerland—Jul. 13, 2012.

International Preliminary Report on Patentability—PCT/US2010/059538, The International Bureau of WIPO—Geneva, Switzerland,Jul. 13, 2012.

International Preliminary Report on Patentability—PCT/US2010/059542—The International Bureau of WIPO—Geneva, Switzerland, Jul. 4, 2012.

(56) References Cited

OTHER PUBLICATIONS

International Preliminary Report on Patentability—PCT/US2010/059550, The International Bureau of WIPO—Geneva, Switzerland—May 4, 2012.
International Preliminary Report on Patentability—PCT/US2010/059560—The International Bureau of WIPO—Geneva, Switzerland, Jul. 12, 2012.
International Search Report and Written Opinion—PCT/US2010/058075—ISA/EPO—Apr. 27, 2011.
International Search Report and Written Opinion—PCT/US2010/059535, ISA/EPO—Apr. 28, 2011.
International Search Report and Written Opinion—PCT/US2010/059560—ISA/EPO—Jun. 15, 2011.
International Search Report and Written Opinion—PCT/US2010/059562, ISA/EPO—May 27, 2011.
International Search Report and Written Opinion—PCT/US2010/059538, International Search Authority—European Patent Office—Apr. 7, 2011.
Semeraro, et al., "Energy-Efficient Processor Design Using Multiple Clock Domains with Dynamic Voltage and Frequency Scaling," International Symposium on High-Performance Computer Architecture, pp. 0029, Eighth International Symposium on High-Performance Computer architecture (HPCA'02), 2002, Boston, Massachusetts. ISBN: 0-7695-1525-8.
Wonyoung Kim, Meeta S. Gupta, Gu-Yeon Wei and David Brooks, "System Level Analysis of Fast, Per-Core DVFS using On-Chip Switching Regulators." IEEE International Symposium on High-Performance Computer Architecture (HPCA), Feb. 2008.
Kondo M., et al., "Dynamic Processor Throttling for Low Power Computing", IPSJ Transactions on Advanced Computing Systems, Information Processing Society of Japan, May 15, 2004, vol. 45 No. SIG6 (ACS6), pp. 1-11.
International Search Report and Written Opinion—PCT/US2013/061663—ISA/EPO—Dec. 2, 2013.
Kanai J, et al., "Statistical Prediction-based Energy-Aware Linux Scheduler for CMP systems", Proceedings of computer system symposium (IPSJ symposium series), vol. 2008, No. 12, Information Processing Society of Japan, Nov. 5, 2008, pp. 77-86.
Sasaki H., et al., "Dynamic Optimization for CMP by Efficient Regression Modeling", IPSJ SIG Technical Reports, Japan, Information Processing Society of Japan, Jul. 29, 2008, vol. 2008, No. 75, pp. 31-36.

SYSTEM AND METHOD FOR CONTROLLING CENTRAL PROCESSING UNIT POWER WITH GUARANTEED TRANSIENT DEADLINES

RELATED APPLICATIONS

This application is a continuation-in-part of U.S. patent application Ser. No. 12/944,467, entitled "System and Method for Controlling Central Processing Unit Power with Guaranteed Transient Deadlines" filed Nov. 11, 2010, which claims the benefit of priority to U.S. Provisional Application No. 61/286,991 entitled "System and Method of Dynamically Controlling Power in a Central Processing Unit" filed Dec. 16, 2009, both of which are incorporated by reference in their entirety.

CROSS-REFERENCE APPLICATIONS

The present application is related to, and incorporates by reference, U.S. patent application Ser. No. 12/944,140 entitled "System And Method For Controlling Central Processing Unit Power Based On Inferred Workload Parallelism," by Rychlik et al.; U.S. patent application Ser. No. 12/944,202 entitled "System and Method for Controlling Central Processing Unit Power in a Virtualized System," by Rychlik et al.; U.S. patent application Ser. No. 12/944,321 entitled "System and Method for Asynchronously and Independently Controlling Core Clocks in a Multicore Central Processing Unit," by Rychlik et al.; U.S. patent application Ser. No. 12/944,378 entitled "System and Method for Controlling Central Processing Unit Power with Reduced Frequency Oscillations," by Thomson et al.; U.S. patent application Ser. No. 12/944,561 entitled "System and Method for Controlling Central Processing Unit Power With Guaranteed Steady State Deadlines," by Thomson et al.; and U.S. patent application Ser. No. 12/944,564 entitled "System and Method for Dynamically Controlling a Plurality of Cores in a Multicore Central Processing Unit based on Temperature," by Sur et al.

DESCRIPTION OF THE RELATED ART

Portable computing devices (PCDs) are ubiquitous. These devices may include cellular telephones, portable digital assistants (PDAs), portable game consoles, palmtop computers, and other portable electronic devices. In addition to the primary function of these devices, many include peripheral functions. For example, a cellular telephone may include the primary function of making cellular telephone calls and the peripheral functions of a still camera, a video camera, global positioning system (GPS) navigation, web browsing, sending and receiving emails, sending and receiving text messages, push-to-talk capabilities, etc. As the functionality of such a device increases, the computing or processing power required to support such functionality also increases. Further, as the computing power increases, there exists a greater need to effectively manage the processor, or processors, that provide the computing power.

Accordingly, what is needed is an improved method of controlling power within a multicore CPU.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
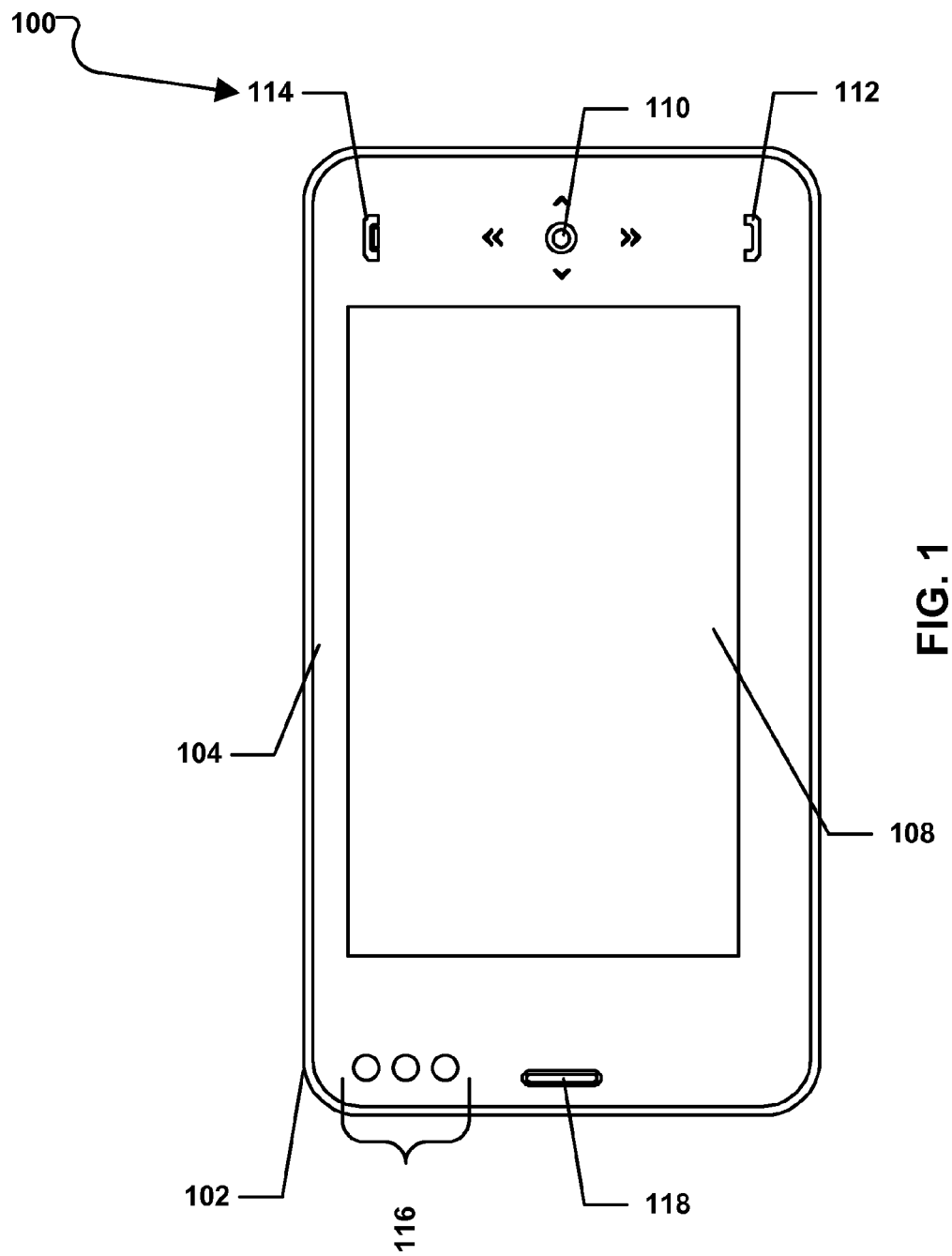
FIG. 1 is a front plan view of a first aspect of a portable computing device (PCD) in a closed position.
Figure 2:
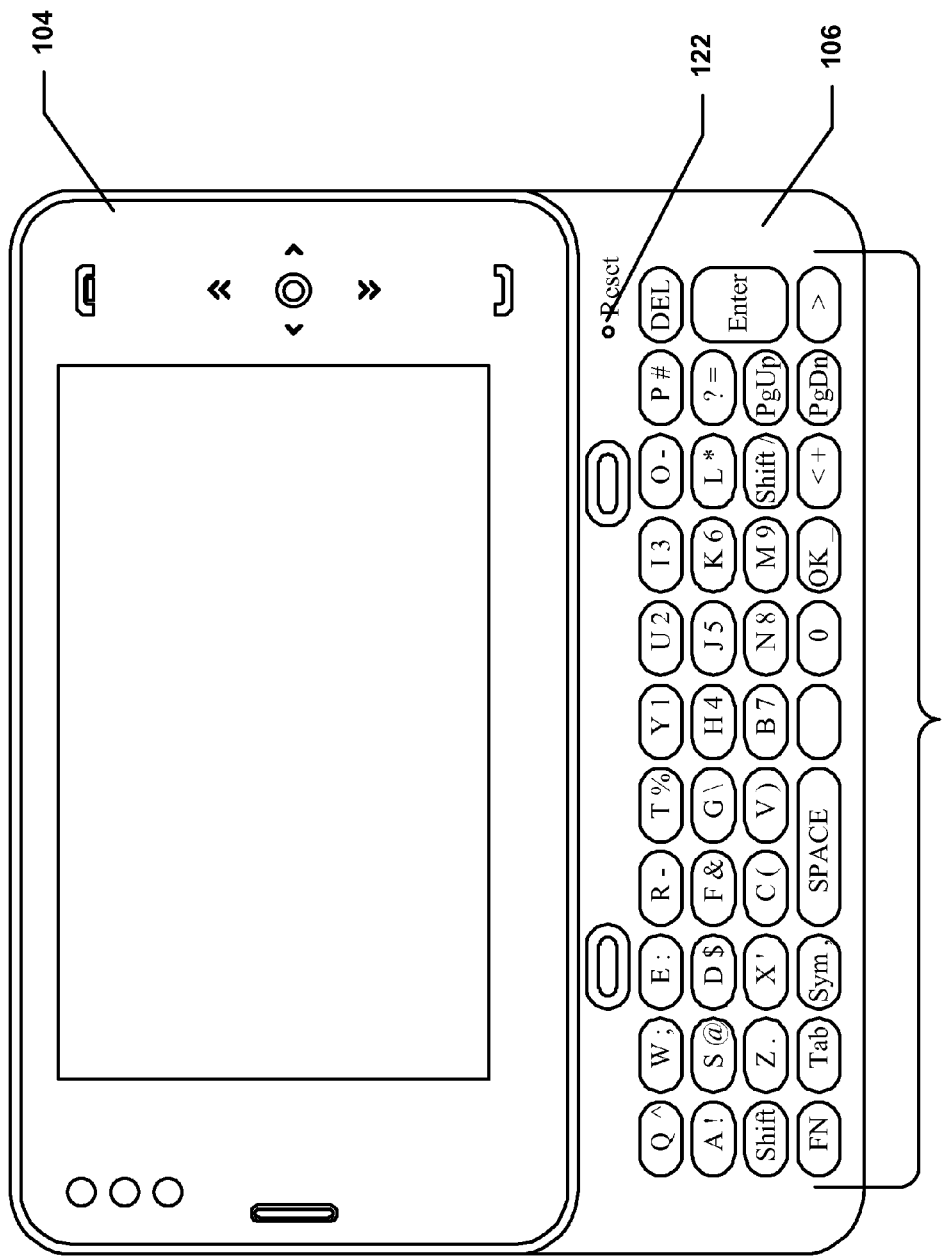
FIG. 2 is a front plan view of the first aspect of a PCD in an open position.

Referring initially to FIG. 1 and FIG. 2, an exemplary portable computing device (PCD) is shown and is generally designated 100. As shown, the PCD 100 may include a housing 102. The housing 102 may include an upper housing portion 104 and a lower housing portion 106. FIG. 1 shows that the upper housing portion 104 may include a display 108. In a particular aspect, the display 108 may be a touch screen display. The upper housing portion 104 may also include a trackball input device 110. Further, as shown in FIG. 1, the upper housing portion 104 may include a power on button 112 and a power off button 114. As shown in FIG. 1, the upper housing portion 104 of the PCD 100 may include a plurality of indicator lights 116 and a speaker 118. Each indicator light 116 may be a light emitting diode (LED).

In a particular aspect, as depicted in FIG. 2, the upper housing portion 104 is movable relative to the lower housing portion 106. Specifically, the upper housing portion 104 may be slidable relative to the lower housing portion 106. As shown in FIG. 2, the lower housing portion 106 may include a multi-button keyboard 120. In a particular aspect, the multi-button keyboard 120 may be a standard QWERTY keyboard. The multi-button keyboard 120 may be revealed when the upper housing portion 104 is moved relative to the lower housing portion 106. FIG. 2 further illustrates that the PCD 100 may include a reset button 122 on the lower housing portion 106.

Figure 3:
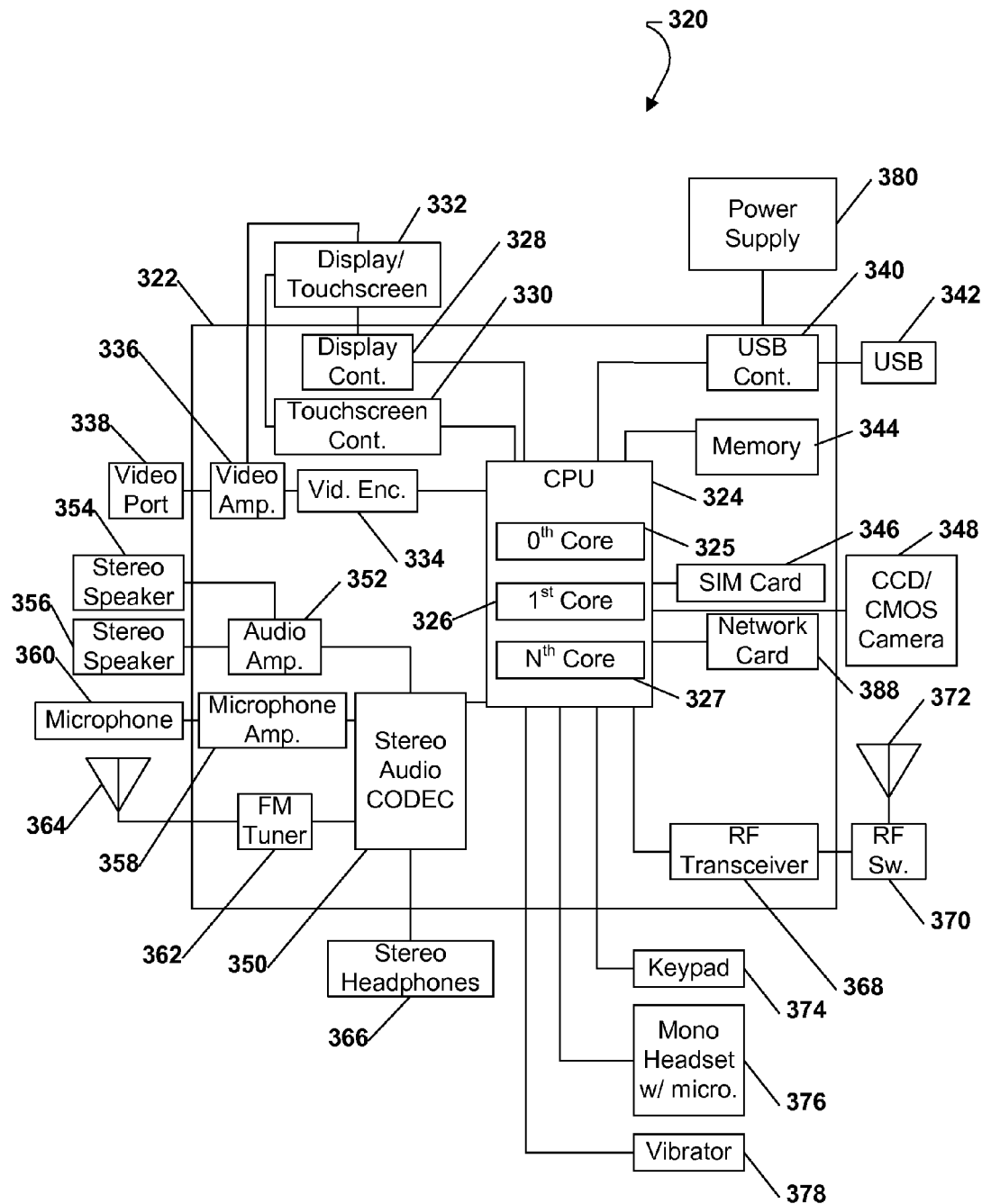
FIG. 3 is a block diagram of a second aspect of a PCD.

Referring to FIG. 3, an exemplary, non-limiting aspect of a portable computing device (PCD) is shown and is generally designated 320. As shown, the PCD 320 includes an on-chip system 322 that includes a multicore CPU 324. The multicore CPU 324 may include a zeroth core 325, a first core 326, and an Nth core 327.

As illustrated in FIG. 3, a display controller 328 and a touch screen controller 330 are coupled to the multicore CPU 324. In turn, a display/touch screen 332 external to the on-chip system 322 is coupled to the display controller 328 and the touch screen controller 330.

FIG. 3 further indicates that a video encoder 334, e.g., a phase alternating line (PAL) encoder, a sequential couleur a memoire (SECAM) encoder, or a national television system(s) committee (NTSC) encoder, is coupled to the multicore CPU 324. Further, a video amplifier 336 is coupled to the video encoder 334 and the display/touch screen 332. Also, a video port 338 is coupled to the video amplifier 336. As depicted in FIG. 3, a universal serial bus (USB) controller 340 is coupled to the multicore CPU 324. Also, a USB port 342 is coupled to the USB controller 340. A memory 344 and a subscriber identity module (SIM) card 346 may also be coupled to the multicore CPU 324. Further, as shown in FIG. 3, a digital camera 348 may be coupled to the multicore CPU 324. In an exemplary aspect, the digital camera 348 is a charge-coupled device (CCD) camera or a complementary metal-oxide semiconductor (CMOS) camera.

As further illustrated in FIG. 3, a stereo audio CODEC 350 may be coupled to the multicore CPU 324. Moreover, an audio amplifier 352 may coupled to the stereo audio CODEC 350. In an exemplary aspect, a first stereo speaker 354 and a second stereo speaker 356 are coupled to the audio amplifier 352. FIG. 3 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 3 further indicates that a radio frequency (RF) transceiver 368 may be coupled to the multicore CPU 324. An RF switch 370 may be coupled to the RF transceiver 368 and an RF antenna 372. As shown in FIG. 3, a keypad 374 may be coupled to the multicore CPU 324. Also, a mono headset with a microphone 376 may be coupled to the multicore CPU 324. Further, a vibrator device 378 may be coupled to the multicore CPU 324. FIG. 3 also shows that a power supply 380 may be coupled to the on-chip system 322. In a particular aspect, the power supply 380 is a direct current (DC) power supply that provides power to the various components of the PCD 320 that require power. Further, in a particular aspect, the power supply is a rechargeable DC battery or a DC power supply that is derived from an alternating current (AC) to DC transformer that is connected to an AC power source.

FIG. 3 further indicates that the PCD 320 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

As depicted in FIG. 3, the display/touch screen 332, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

In a particular aspect, one or more of the method steps described herein may be stored in the memory 344 as computer program instructions. These instructions may be executed by the multicore CPU 324 in order to perform the methods described herein. Further, the multicore CPU 324, the memory 344, or a combination thereof may serve as a means for executing one or more of the method steps described herein in order to a dynamically control the power of each CPU, or core, within the multicore CPU 324.

Figure 4:
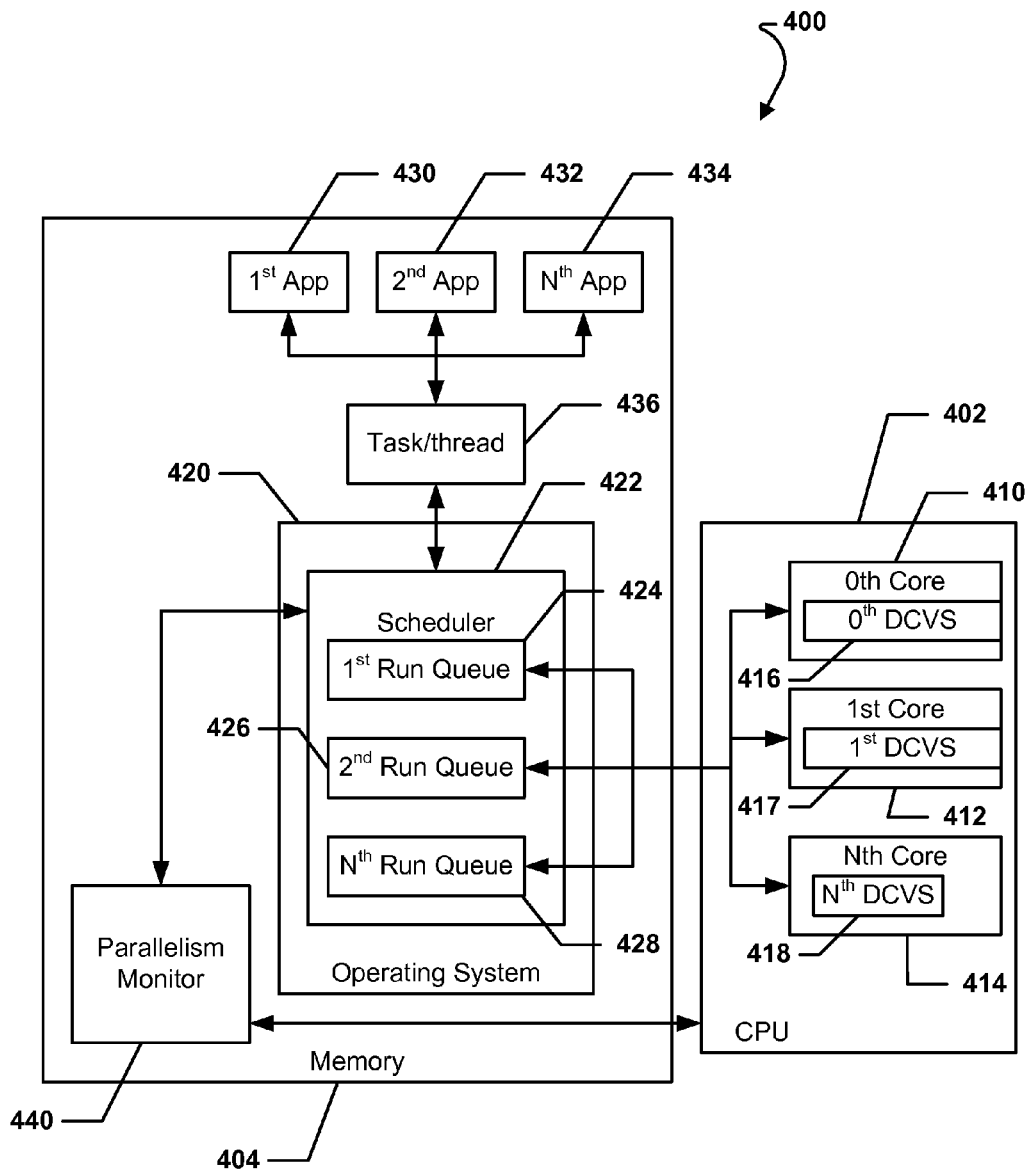
FIG. 4 is a block diagram of a processing system.

Referring to FIG. 4, a processing system is shown and is generally designated 400. In a particular aspect, the processing system 400 may be incorporated into the PCD 320 described above in conjunction with FIG. 3. As shown, the processing system 400 may include a multicore central processing unit (CPU) 402 and a memory 404 connected to the multicore CPU 402. The multicore CPU 402 may include a zeroth core 410, a first core 412, and an Nth core 414. The zeroth core 410 may include a zeroth dynamic clock and voltage scaling (DCVS) algorithm 416 executing thereon. The first core 412 may include a first DCVS algorithm 417 executing thereon. Further, the Nth core 414 may include an Nth DCVS algorithm 418 executing thereon. In a particular aspect, each DCVS algorithm 416, 417, 418 may be independently executed on a respective core 410, 412, 414.

Moreover, as illustrated, the memory 404 may include an operating system 420 stored thereon. The operating system 420 may include a scheduler 422 and the scheduler 422 may include a first run queue 424, a second run queue 426, and an Nth run queue 428. The memory 404 may also include a first application 430, a second application 432, and an Nth application 434 stored thereon.

In a particular aspect, the applications 430, 432, 434 may send one or more tasks 436 to the operating system 420 to be processed at the cores 410, 412, 414 within the multicore CPU 402. The tasks 436 may be processed, or executed, as single tasks, threads, or a combination thereof. Further, the scheduler 422 may schedule the tasks, threads, or a combination thereof for execution within the multicore CPU 402. Additionally, the scheduler 422 may place the tasks, threads, or a combination thereof in the run queues 424, 426, 428. The cores 410, 412, 414 may retrieve the tasks, threads, or a combination thereof from the run queues 424, 426, 428 as instructed, e.g., by the operating system 420 for processing, or execution, of those task and threads at the cores 410, 412, 414.

FIG. 4 also shows that the memory 404 may include a parallelism monitor 440 stored thereon. The parallelism monitor 440 may be connected to the operating system 420 and the multicore CPU 402. Specifically, the parallelism monitor 440 may be connected to the scheduler 422 within the operating system 420.

Figure 5:
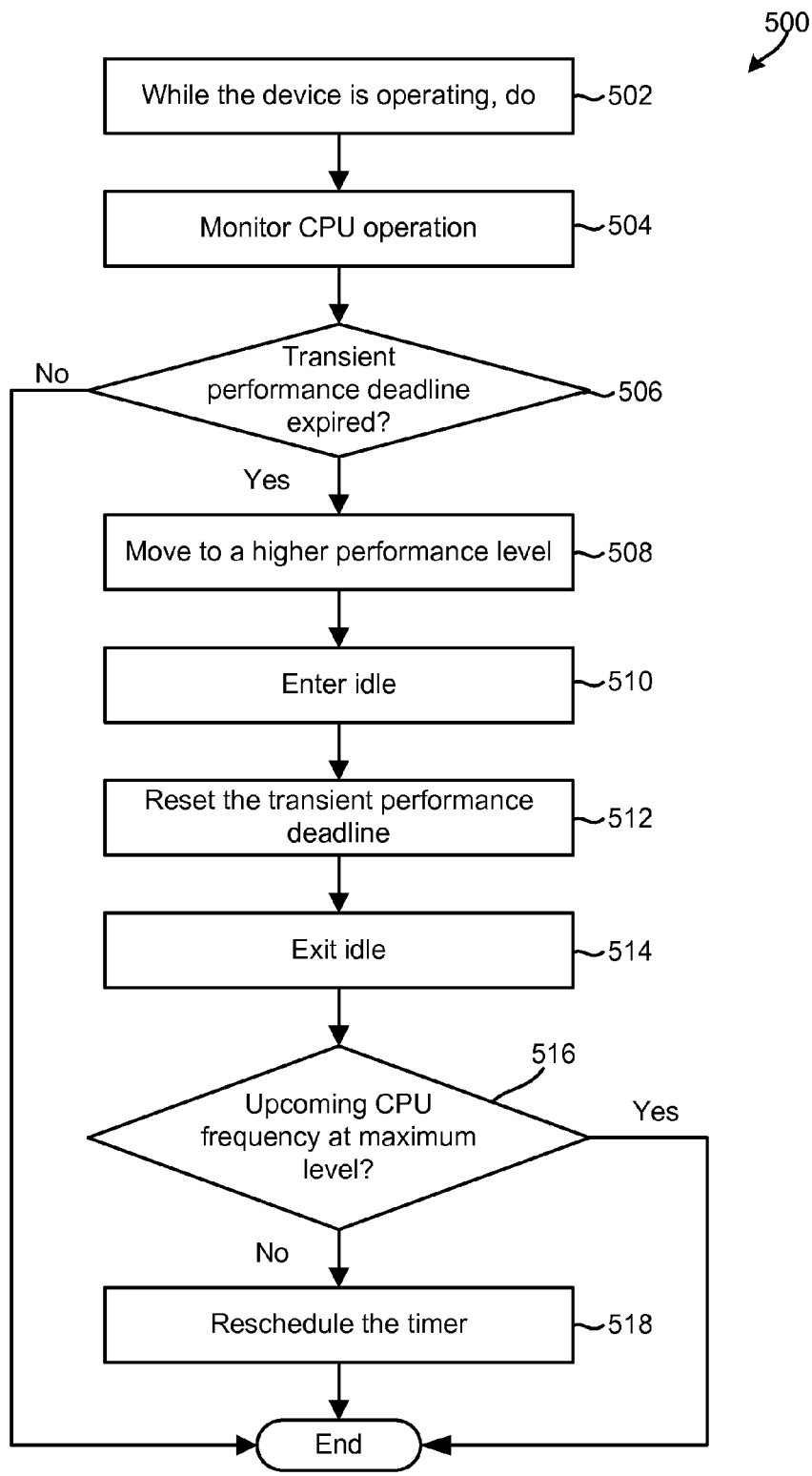
FIG. 5 is a flowchart illustrating a first aspect of a method of dynamically controlling power within a CPU.

Referring to FIG. 5, a first aspect of a method of dynamically controlling the power of a central processing unit is shown and is generally designated 500. The method 500 may commence at block 502 with a do loop in which when device is powered on, the following steps may be performed.

At block 504, a power controller, e.g., a dynamic clock and voltage scaling (DCVS) algorithm, may monitor one or more CPUs. At decision 506, the power controller may determine whether a transient performance deadline for a CPU has expired. If not, the method 500 may end. Otherwise, if the transient performance deadline has expired, the method 500 may proceed to block 508 and the power controller may move the CPU to a higher performance level, i.e., a next higher operating frequency. In one aspect, the controller may move the CPU to a maximum performance level, i.e., a maximum CPU frequency. However, in another aspect, the CPU may not jump to a maximum performance level. The CPU may jump to an intermediate level and then, jump again, either to the maximum level or another higher performance level. The number of intermediate jumps, and the amount of time between jumps, may be used to determine the frequency value of the jump.

At block 510, the CPU may enter an idle condition. Further, at block 512, the transient performance deadline may be reset. At block 514, the CPU may exit the idle condition. Moving to decision 516, the power controller may determine whether the upcoming CPU frequency is at a maximum CPU frequency. If so, the method 500 may end. Otherwise, if the CPU frequency is not at the maximum CPU frequency, the method may proceed to block 518 and the timer may be rescheduled. Then, the method 500 may end.

Figure 6:
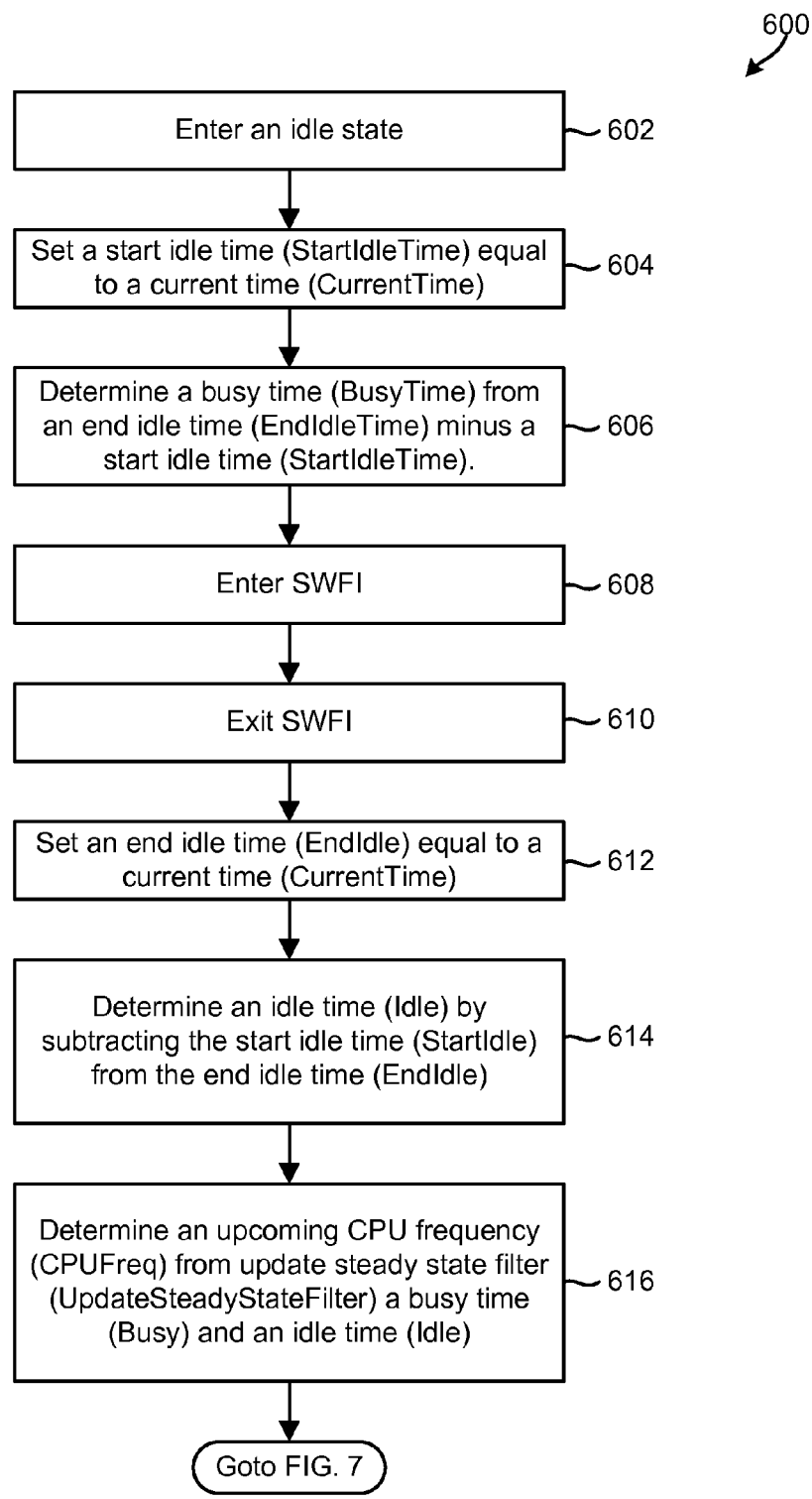
FIG. 6 is a flowchart illustrating a first portion of a second aspect of a method of dynamically controlling power within a CPU.

Referring to FIG. 6, a second aspect of a method of dynamically controlling the power of a central processing unit is shown and is generally designated 600. Beginning at block 602, a central processing unit (CPU) may enter an idle state. At block 604, a power controller, e.g., a dynamic clock and voltage scaling (DCVS) algorithm, may set a start idle time (StartIdleTime) equal to a current time (CurrentTime). Further, at block 606, the power controller may determine a busy time (BusyTime) by subtracting a start idle time (StartIdleTime) from an end idle time (EndIdleTime).

At block 608, the CPU may enter a software wait for interrupt (SWFI) condition. At block 610, the CPU may exit the SWFI condition. Moving to block 612, the power controller may set an end idle time (EndIdleTime) equal to a current time (CurrentTime). Further, at block 614, the power controller may determine an idle time (IdleTime) by subtracting the start idle time (StartIdleTime) from the end idle time (EndIdleTime). At block 616, the power controller may determine an upcoming CPU frequency (CPUFreq) from an updated steady state filter (UpdateSteadyStateFilter) a busy time (BusyTime) and an idle time (IdleTime). Thereafter, the method 600 may continue to block 702 of FIG. 7.

At block 702, the power controller may determine an effective transient budget (EffectiveTransientBudget) using the following formula:

$$\text{EffectiveTransientBudget} = (\text{TransientResponseDeadline} * \text{NextCPUFreq}) / (\text{NextCPUFreq} - \text{CPUFreq})$$

where,

TransientResponseDeadline=A transient response deadline, i.e., slack budget,

NextCPUFreq=A next CPU frequency that is one frequency step higher than an upcoming CPU frequency, and CPUFreq=An upcoming CPU frequency (CPUFreq).

In a particular aspect, a clock scheduling overhead (ClockSchedulingOverhead) and a clock switch overhead (ClockSwitchOverhead) may also be added to the EffectiveTransientBudget. Further, a voltage change overhead (VoltageChangeOverhead) may be added to the EffectiveTransientBudget. Moving to block 704, the power controller may set a deadline to jump to a higher frequency (SetJumpToFrequency) equal to the end idle time (EndIdleTime) plus the effective transient budget (EffectiveTransientBudget). In another aspect, the deadline to jump may be the current time plus the transient budget. Thereafter, the method 600 may end.

Figure 7:
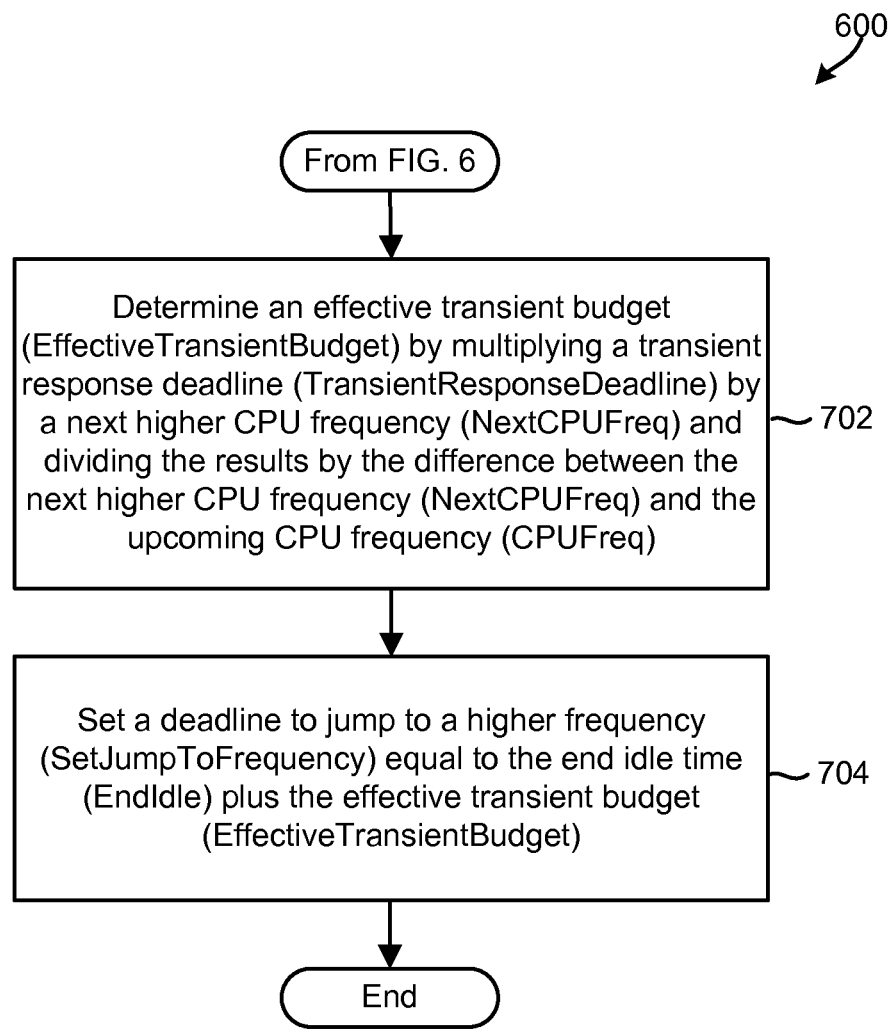
FIG. 7 is a flowchart illustrating a second portion of the second aspect of a method of dynamically controlling power within a multicore CPU.

In a particular aspect, the method 600 described in conjunction with FIG. 6 and FIG. 7 may be used to calculate the amount of time that the CPU may remain at the frequency determined by the DCVS before the transient deadline is exhausted and schedule a jump to the higher CPU frequency by that amount of time in the future. If idle is reentered prior to the jump to the higher frequency, the scheduled jump may be cancelled. The method 600 may delay the jump to the higher frequency by the amount of time determined as the EffectiveTransientBudget.

It is to be understood that the method steps described herein need not necessarily be performed in the order as described. Further, words such as "thereafter," "then," "next," etc. are not intended to limit the order of the steps. These words are simply used to guide the reader through the description of the method steps. Moreover, the methods described herein are described as executable on a portable computing device (PCD). The PCD may be a mobile telephone device, a portable digital assistant device, a smartbook computing device, a netbook computing device, a laptop computing device, a desktop computing device, or a combination thereof.

In a particular aspect, a DCVS algorithm is a mechanism which measures CPU load/idle time and dynamically adjusts the CPU clock frequency to track the workload in an effort to reduce power consumption while still providing satisfactory system performance. As the workload changes, the change in CPU throughput may track, but also necessarily lag, the changes in the workload. Unfortunately, this may introduce a problem in cases where the workload has Quality of Service (QoS) requirements, as the DCVS algorithm may not track the workload quickly enough. Further, tasks may fail.

Many DCVS techniques involve measuring the steady state performance requirements of the CPU and setting the CPU frequency and voltage to the lowest level that may meet the steady state CPU usage. This is typically done by measuring the CPU utilization (percentage busy) over a period of time and setting the CPU performance level to one in which the average CPU utilization falls between a high and low threshold. The averaging period is optimized to minimize the frequency of changing clock frequencies, while maintaining reasonable responsiveness. In order to respond to transient workloads and/or the start of new workloads panic inputs may have been utilized to quickly bring up the CPU frequency.

In order to avoid the problem of the DCVS lagging the workload and causing tasks to fail, the system and methods disclosed herein provide a transient performance guarantee. The transient performance guarantee may be defined as the maximum amount of time that a continuously busy pulse may be delayed, as compared to running at the higher performance level. This may be accomplished by getting to the higher performance level prior to the transient performance deadline expiring and resetting the deadline whenever we go idle, since if the CPU is idle, it is by definition not in an oversubscribed state. As disclosed herein, the timer may be rescheduled to preserve the QoS guarantee whenever the system comes out of idle and the system CPU is not running at the maximum frequency.

Figure 8:
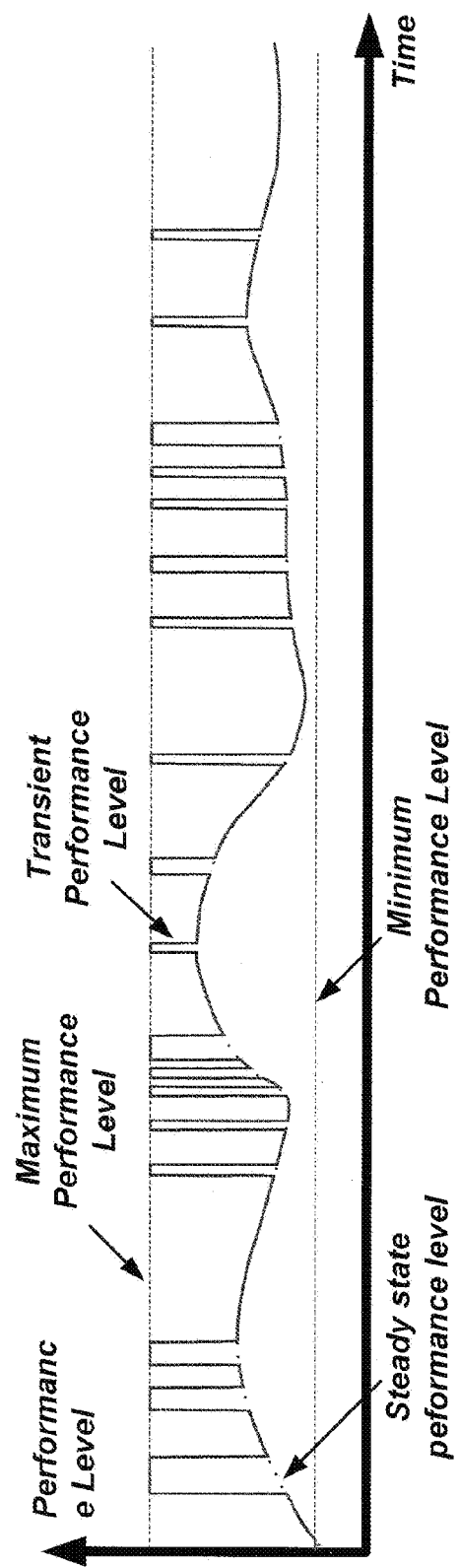
FIG. 8 is an exemplary graph showing the dynamic clock and voltage scaling (DCVS) controlled CPU frequency plotted over time.

In order to minimize the power impact of the transient performance guarantee, the present system and methods minimize the likely hood that an incoming pulse may require a frequency increase in order to meet the deadline. This may be accomplished by delaying the frequency, i.e., performance level, change until the effective transient budget has been exhausted and then, jumping straight to the higher performance level and staying there until the pulse is complete as shown in FIG. 8.

Figure 9:
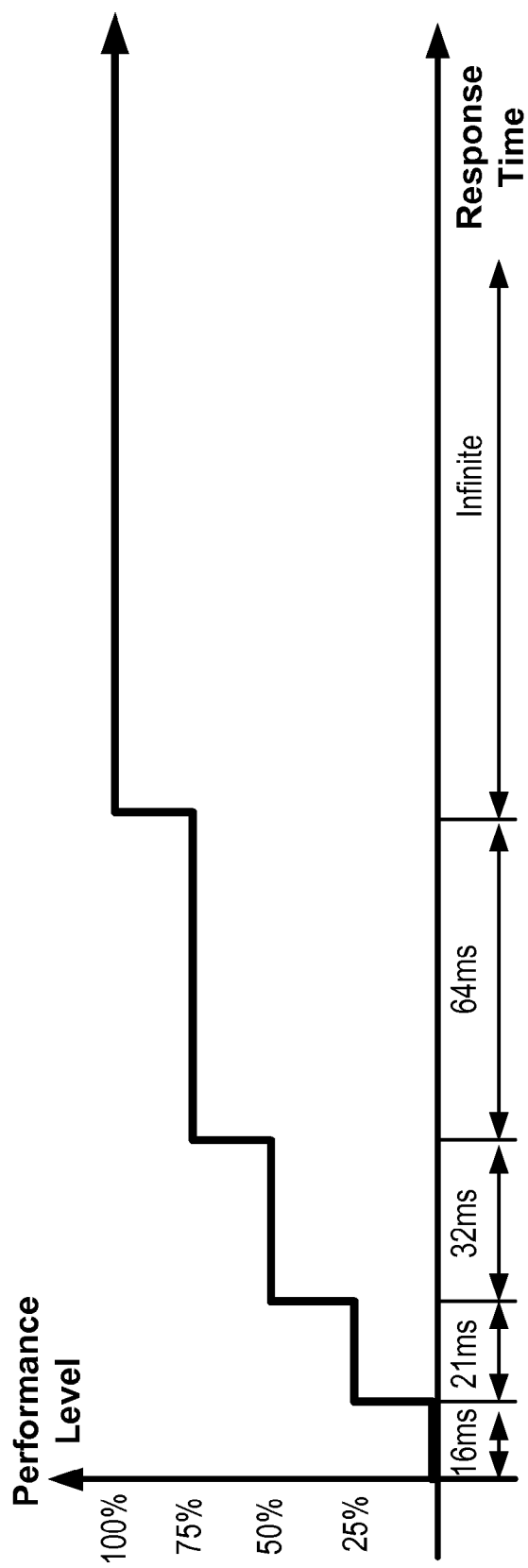
FIG. 9 is an exemplary graph showing effective transient response times for various performance levels.

In a particular aspect, the effective transient budget is calculated as the transient response deadline scaled to the current performance level. For example, if the CPU is running a 75% of the maximum clock rate and the transient response deadline is 16 ms, the effective transient budget is 64 ms, i.e., 16 ms/(1−0.75). The effective transient budget represents how long the CPU may run at the current performance level prior to exhausting the budget. If the CPU is idle, the effective transient budget may be the same as the transient response deadline. If we are at the maximum performance level, the effective transient budget is infinite as shown in FIG. 9.

Using the methods described herein, the system may provide a strict bound on the maximum amount of time a task might run at some level other than the maximum level, and therefore implicitly provide a calculable bound on completion for tasks that require QoS guarantees, while still allowing dynamic CPU clock scaling. The bound may be set based on what tasks are currently running, a global system property, DCVS algorithm design or other properties, and may be entirely disabled if the system is not running any tasks that have QoS requirements or if the CPU is running at max clock.

In a particular aspect, the present methods may be extended by, instead of jumping to the maximum frequency when the deadline has expired, setting shorter internal effective deadlines and jumping to one, or more, intermediate frequencies, while still ensuring that the CPU is at the maximum frequency before the maximum QoS delay has been exhausted. Further, the present methods may substantially ensure that a well defined transient QoS is maintained, while simultaneously reducing overall CPU power.

The system and methods described herein may utilize opportunistic sampling. In other words, the system and methods may check for timer expiration on a periodic basis. In other aspects, the system and methods may not utilize opportunistic sampling.

As discussed above, the various aspects provide a strict and calculable bound (e.g., a performance guarantee) for the completion for tasks. In various aspects, such performance guarantees may be implemented as part of a dynamic clock and voltage/frequency scaling (DCVS) solution to improve processor performance and/or reduce power consumption on portable computing devices (PCDs), including mobile devices such as cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices that include a memory, a programmable processor or core (herein collectively "processing core") and operate under battery power such that power conservation methods are of benefit. Further, while the various aspects are particularly useful for portable and mobile computing devices that run on battery power, the aspects are generally useful in any computing device (e.g., general-purpose computers, desktop computers, servers, etc.) that includes a processor and for which reduced power consumption is beneficial.

Generally, the dynamic power (switching power) dissipated by a chip is $C*V^2*f$, where C is the capacitance being switched per clock cycle, V is voltage, and f is the switching frequency. Thus, as frequency changes, the dynamic power will change linearly with it. Dynamic power may account for approximately two-thirds of the total power consumed by a processor chip. Voltage scaling may be accomplished in conjunction with frequency scaling, because the frequency at which a chip runs may be related to its operating voltage. The efficiency of some electrical components, such as voltage regulators, may decrease with increasing temperature so that the power consumption increases with temperature. Since increasing power use may increase the temperature, increases in voltage or frequency may increase system power demands even further. Thus, the battery life of a computing device may be improved by reducing the frequency and/or voltage applied to its processors when they are idle or lightly loaded. Such reductions in frequency and/or voltage may be accomplished in real time or "on the fly" via a dynamic clock and voltage/frequency scaling (DCVS) solution.

Generally, a DCVS solution monitors the proportion of the time that a processor is idle (compared to the time it is busy), and determines how much the frequency/voltage of the processors should be adjusted based on the proportion of the time the processors is idle and/or busy. Monitoring the proportion of the time that a processor is idle may include computing and/or measuring a value (e.g., amount of time, number of CPU cycles, etc.) indicative of the duration that the processor executes an idle process or thread (e.g., a system idle process, etc.).

An operating system may execute an idle software application, process, or thread (herein collectively "thread") on the processor when it determines that there are no other threads ready to be scheduled on that processor. The idle thread may perform various tasks (e.g., wait for interrupt task, sleep task, etc.), and each task may include a number of processor operations. When a processor executes an idle thread, that processor may be said to be "idle" in an "idle state," and/or in an "idle condition."

In multiprocessor systems, an operating system (or scheduler, controller, etc.) may maintain one or more idle threads for each processor. Idle threads remain ready for execution so that each processor always has a thread ready to execute. In this manner, whenever a thread relinquishes a processor (e.g., due to the thread completing its scheduled tasks or workloads), the operating system has a thread ready for execution on that processor (e.g., via the availability of the idle thread), even when all other threads are complete, waiting for resources, or otherwise not currently ready to execute.

As discussed above, a DCVS solution may adjust a processor's frequency and/or voltage based on that processor's workloads, which may include a steady state workload. A steady state workload may be determined in advance of execution time, that is in advance of the processing core entering a busy or active state to perform operations in furtherance of the workload. The steady state workload may be determined in advance by computing, estimating, or predicting the number of CPU clock cycles, number of operations, number of instructions, and/or amount of time required to complete the tasks scheduled on that processing core. Each processor may have more than one workload (e.g., a steady state workload and a transient workload), and each processor may be required to remain in a busy, running, or active state (herein collectively "busy state") until all the tasks in all its workloads are complete.

In certain scenarios, a DCVS solution may reduce a processor's frequency and/or voltage (i.e., the processor's speed) to achieve power savings without impacting the processor's performance. For example, when the processor's workload includes a task whose execution time is dominated by memory access times, a reduction in frequency may not have a significant impact on that processor's performance or that task's execution time. However, more often, the DCVS solution must balance tradeoffs between the processor's performance (e.g., time required to complete a given set of tasks, etc.) and power consumption (e.g., amount of battery power consumed in accomplishing the given set of tasks) characteristics. Typically, the faster the tasks are accomplished, the more power is consumed by the processor in accomplishing those tasks.

A DCVS solution may be configured to balance the performance and power consumption based on a processor's steady state workload and steady state performance requirements. The steady state performance requirements may be determined by computing or measuring a value (e.g., amount of time, number of CPU cycles, etc.) indicative of a duration in which the processor is busy and/or idle, averaging the results of the computed/measured values, and determining the amount of time/processing that is required to complete that processor's steady state workloads. Based on these computations, the DCVS solution may compute an upper frequency threshold and a lower frequency threshold within which the processor may operate to meet the computed steady state requirements while achieving reduced power consumption and acceptable levels of responsiveness (e.g., such that a mobile device user does not notice a difference, etc.).

Often, processors are required to process/execute transient workloads, which include "bursts of work" that the DCVS solution was not informed of a priori, and which were not accounted for in the steady state or frequency threshold computations. A transient workload may be any task or unit of work that is not known to the system in advance, including any unit of work that is dynamic, temporary, or which causes an unexpected spike in the processor's workload. By way of example, a transient workload may include any or all of tasks performed by a processor in response to user inputs, system events, detected environmental conditions, remote procedure calls, etc. As a further example, a transient workload may be generated when a user touches a touch-screen of a portable computing device (PCD) to initiate a user action, to which the PCD must respond immediately (e.g., with an interface update, by displaying a new image, launching a new action, etc.).

As mentioned above, transient workloads are not continuous steady state workloads for which the DCVS solution can properly account for in advance (e.g., as part of determining the upper and lower thresholds). As a result, a transient workload may cause a processor to remain in a busy state for longer than expected and/or otherwise result in uncertainties in processor execution times. Such uncertainties may cause the computing device to allocate processing and system resources inefficiently or improperly, and may have a significant impact on the overall performance and/or responsiveness of a computing device, especially when the computing device includes multiple processing cores.

Modern computing devices are often multiprocessor systems that include system-on-chips (SoCs) and/or multiple processing cores (e.g., processors, cores, etc.). In multiprocessor systems, it is common for a single thread to be processed by a first processing core, then by a second processing core, and then again by the first processing core. It is also common for the results of one thread in a first processing core to trigger operations in another thread executing in a second processing core. For example, one or more processing cores may be dependent on the results generated by a currently active processor, and may be required to remain in an idle or wait state until the currently active processor completes its workloads and/or finishes processing one or more tasks. In these situations, each processing core may alternatively enter an idle/wait state while it awaits the results of processing from the currently active processor. While these processing cores wait for the results generated by the currently active processor, their respective DCVS solutions may reduce their operating speeds (i.e., via a reduction in frequency/voltage), causing the computing device to appear non-responsive or slow. That is, a DCVS solution implemented on multiprocessor computing devices may incorrectly conclude that the some of the processing cores should be operated at lower frequency or voltage than is optimal for running the currently active threads, and cause the computing device to appear non-responsive or slow.

The various aspects overcome the above mentioned limitations by computing and enforcing performance guarantees that ensure a processing core does not remain in a busy state (e.g., due to transient workloads) for more than a predetermined amount of time above which is required for that processing core to complete its pre-computed steady state workload. Such performance guarantees may be used by the operating system, resources, DCVS solutions, and/or other processing cores to better estimate, schedule, and/or plan future operations, such as allocating resources and scheduling threads for execution. In this manner, the performance guarantees enable the computing device to meet its responsiveness requirements, and thus improve the user experience.

Performance guarantees allow a DCVS solution to adjust the frequency and/or voltage of a processor based on a variable delay, which ensures that the processing core only falls behind its steady state workload by, at most, a defined maximum amount of work, irrespective of the current or previous operating frequencies/voltages of the processor.

Figure 10:
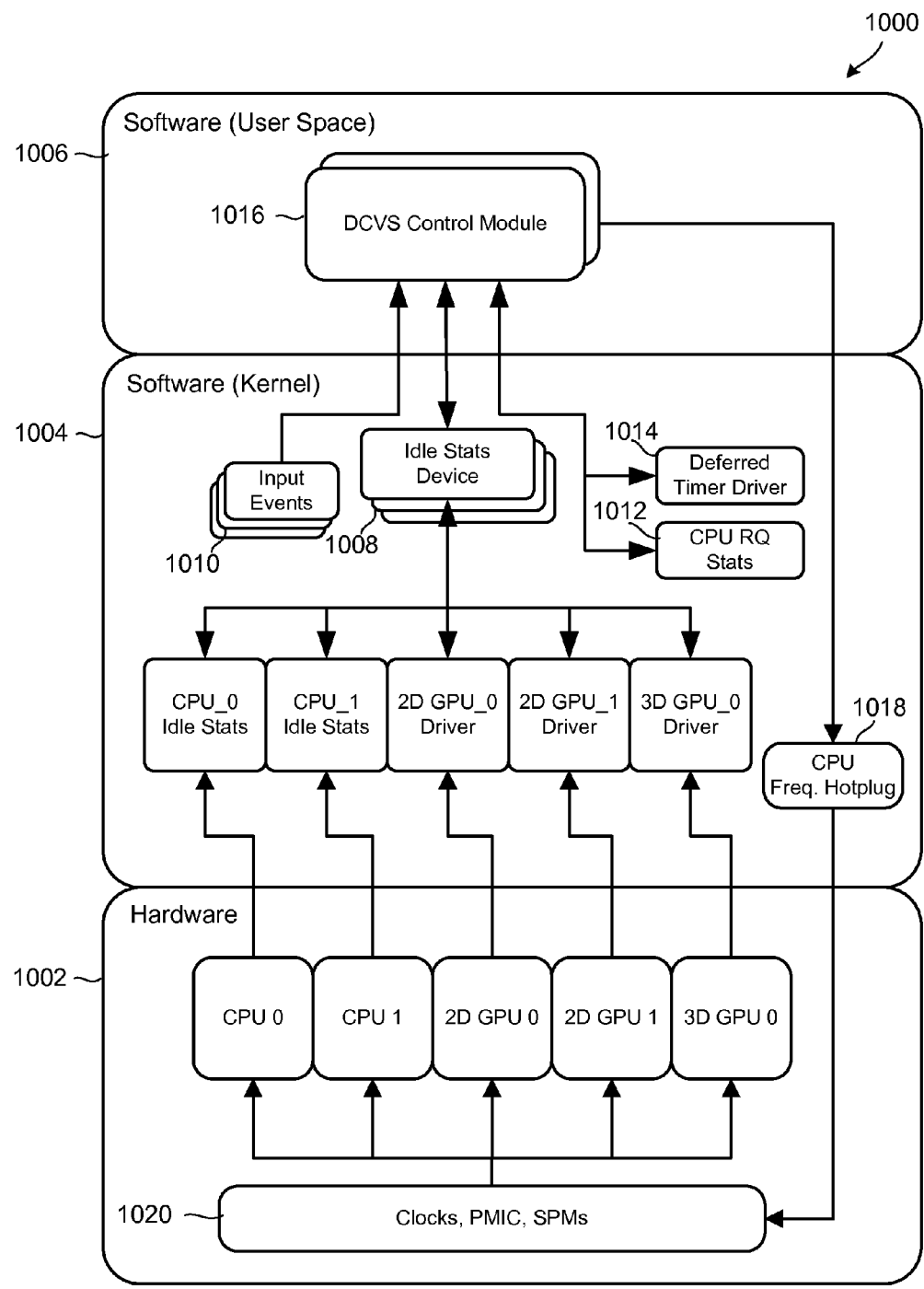
FIG. 10 is a block diagram illustrating logical components and information flows in computing device implementing a dynamic clock frequency/voltage scaling (DCVS) solution that enforces performance guarantees in accordance with the various aspects.

FIG. 10 illustrates logical components and information flows in an aspect computing device 1000 implementing a dynamic clock frequency/voltage scaling (DCVS) solution that enforces performance guarantees. The computing device 1000 may include a hardware unit 1002, a kernel space software unit 1004, and a user space software unit 1006. In an aspect, the kernel space software unit 1004 and the user space software unit 1006 may be included in an operating system or kernel of the computing device 1000. For example, the computing device may include a kernel that is organized into user space (where non-privileged code runs) and kernel space (where privileged code runs). This separation is of particular importance in Android and other general public license (GPL) environments where code that is part of the kernel space must be GPL licensed, while code running in user-space doesn't need to be GPL licensed.

The hardware unit 1002 may include a number of processing cores (e.g., CPU 0, CPU 1, 2D-GPU 0, 2D-GPU 1, 3D-GPU 0, etc.) and a resources module 1020 that includes various hardware resources (e.g., clocks, power management integrated circuits or "PMICs," scratchpad memories or "SPMs," etc.) shared by the processing cores.

The kernel space software unit 1004 may include processor modules (CPU_0 Idle stats, CPU_1 idle stats, 2D-GPU_0 driver, 2D-GPU_1 driver, 3D-GPU_0 driver, etc.) that correspond to at least one of the processing cores in the hardware unit 1002, each of which may communicate with one or more idle stats device modules 1008. The kernel space software unit 1004 may further include a timer driver module 1014, input event modules 1010, and a CPU request stats module 1012. In an aspect, the timer driver module 1014 may drive (or maintain) a timer for each processing core.

The user space software unit 1006 may include a DCVS control module 416 configured to receive inputs from each of the idle stats device modules 1008, input event modules 1010, timer driver module 1014, and CPU request stats module 1012, and/or to send outputs to a CPU frequency hot-plug module 1018. The CPU frequency hot-plug module 1018 may be configured to send communication signals to the resources module 1020. The CPU frequency hot-plug module 1018 may be further configured to apply voltage/frequency changes to each core, either individually (e.g., one at a time, sequentially, etc.) or simultaneously (e.g., at approximately the same point in time).

The DCVS control module 1016 may include threads suitable for execution on any or all of the processing cores (e.g., CPU 0, CPU 1, 2D-GPU 0, 2D-GPU 1, 3D-GPU 0, etc.) and/or suitable for implementing a DCVS solution on the computing device 1000. In an aspect, the DCVS control module 1016 may include a thread that monitors a port or a socket for an occurrence of an event (e.g., filling of a data buffer, expiration of a timer, state transition, etc.) that causes the DCVS control module 1016 to collect information from one or more processing cores and perform DCVS operations on a processing core. In an aspect, the DCVS control module 1016 may include a single-threaded DCVS solution that monitors two or more processing cores. In an aspect, the DCVS control module 1016 may include a DCVS solution thread for each processing core.

In an aspect, the DCVS control module 1016 may be configured to generate pulse trains. The DCVS control module 1016 may generate the pulse trains by monitoring or sampling the busy and/or idle states (or the transitions between states) of the processing cores. The DCVS control module 1016 may also generate the pulse trains based on information obtained from monitoring the depth of one or more processor run-queues. A run-queue may include a running thread as well as a collection of one or more threads that are capable of running on a processing core, but not yet able to do so (e.g., due to another active thread that is currently running, etc.). Each processing core may have its own run-queue, or a single run-queue may be shared my multiple processing cores. Threads may be removed from the run queue when they request to enter a sleep state, are waiting on a resource to become available, or have been terminated. Thus the number of threads in the run queue (i.e., the run queue depth) may identify the number of active threads (e.g., waiting, running), including the thread currently being processed (running) and the thread waiting to be processed.

In an aspect, the DCVS control module 1016 may be configured to compute steady state workloads, steady state requirements, and/or upper and lower frequency/voltage thresholds based on the generated pulse trains. The upper and lower frequency/voltage thresholds may define a frequency/voltage rage within which a processing core may operate to meet the its steady state performance requirements while simultaneously achieving reduced power consumption and meeting the responsiveness requirements of the computing device 1000. Meeting the responsiveness requirements may include performing all the tasks in the workloads so that a user of the computing device 1000 does not notice a reduction in the computing device's performance or speed.

The DCVS control module 1016 may be configured to monitor the overall computing device 1000 performance and/or insure that one or more of the processing cores operate between established upper and lower frequency thresholds. The DCVS control module 1016 may adjust processing resources and/or the operating frequencies of the processing cores so that they are commensurate with the thresholds.

As discussed above, the DCVS control module 1016 may generate pulse trains. In an aspect, pulse trains generated for two or more of the processing cores may be synchronized in time and cross-correlated to generate correlation models that include information suitable for determining whether the processing cores are performing operations that are co-operative and/or dependent on one another. In an aspect, the DCVS control module 1016 may use the correlation models to determine the upper and lower frequency thresholds, initial operating frequency, steady state requirements, and processor workloads so that these value account for the interdependencies between the processing cores.

In an aspect, the DCVS control module 1016 may be configured to compute and/or enforce performance guarantees. As mentioned above, processing cores may be required to process/execute transient workloads that the DCVS solution cannot properly account for in advance. Thus, transient workloads may cause the DCVS control module 1016 to operate one or more of the processing cores at a sub-optimal frequency level or within a sub-optimal frequency range. For example, since the DCVS control module 1016 cannot account for the transient workloads in advance, it may improperly conclude that the processing core may be operated at a lower frequency level than that which is required to complete both the steady state workload and the transient workload in a time period that suitable for meeting the responsiveness requirements of the computing device 1000.

A performance guarantee provides the computing device 1000 with a strict and calculable bound that may be used by the DCVS control module 1016 to ensure a processing core does not remain in a busy state (e.g., due to transient workloads) for more than a predetermined amount of time/work above that which is required for that processing core to complete its steady state workload requirements. A performance guarantee allows the DCVS control module 1016 to ensure that a processing core completes both its steady state workload and its transient workloads in a time period that suitable for meeting the responsiveness requirements of the computing device 1000.

In various aspects, a performance guarantee may be computed in, defined in, and/or include any unit of measurement suitable for measuring processor performance or a duration, such as an amount of time, an amount of work, a number of tasks, a number of instructions, a number of CPU cycles, etc. In various aspects, a performance guarantee may be associated with a frequency and/or may be a function of frequency.

In an aspect, a performance guarantee may include one or more performance guarantee values. In the various aspects, the performance guarantee values (e.g., a deadline value, a budget value, a jump-to-max value, etc.) may be expressed in any unit of measurement suitable for measuring processor performance or a duration, such as an amount of time, an amount of work, a number of tasks, a number of instructions, a number of CPU cycles, etc.

In various aspects, the performance guarantee values may include a budget value (e.g., slack budget, transient budget, etc.), a deadline value (e.g., transient deadline, transient response deadline, performance deadline, etc.), and/or a jump-to-max value.

The deadline value may be a value indicative of a relative time before which the processing core is to complete its workload processing and/or a value indicative of a relative time after which the frequency of a processing core is to be increased.

The budget value may be a value indicative of an amount of time remaining before which the processing core is to complete its workload processing and/or after which the frequency of a processing core is to be increased.

The jump-to-max value may be a value indicative of a relative time before which the processing core is to complete its workload processing and/or after which the frequency of a processing core is to be increased to the maximum frequency.

The performance guarantee values may be a related to, associated with, and/or function of frequency or voltage. For example, each of the budget, deadline, and/or jump-to values may be a time value that is computed as a function of an operating frequency of a corresponding processing core. Thus, each of these values may be 10 milliseconds when the processing core operates at a frequency of 100 MHz, 20 milliseconds at a frequency of 200 MHz, 40 milliseconds at a frequency of 400 MHz, etc. In the manner, the performance guarantee values may used by the DCVS solution to implement a variable delay for increasing the frequency of a processing core.

As mentioned above and illustrated in FIG. 9, the DCVS solution may implement variable delays. Such variable delays ensure that the processing core only falls behind its steady state workload by, at most, a defined maximum amount of work, irrespective of the actual operating frequencies of the processing core. In an aspect, the DCVS solution may set the defined maximum amount of work (i.e., by which the processing core may fall behind its steady state workload) to be equal to the deadline value multiplied by the maximum frequency/voltage of the processing core. In this manner, the performance guarantee is not affected by the DCVS solution adjusting the frequency/voltage of the processing core based on the steady state requirements or dynamically or "on the fly."

In an aspect, the DCVS control module 1016 may be configured to set the deadline value to be equal to the budget value each time the corresponding processing core transitions from idle to busy, enters a busy state (e.g., beings processing the workload, etc.) and/or exits the idle state (e.g., when an idle thread relinquishes the processing core, etc.).

In an aspect, the DCVS control module 1016 may be configured to set or reset an existing deadline value each time the corresponding processing core transitions from busy to idle, enters an idle state (e.g., beings executing an idle thread, etc.) and/or exits the busy state (e.g., completes all tasks in the workload, etc.).

Figure 11A:
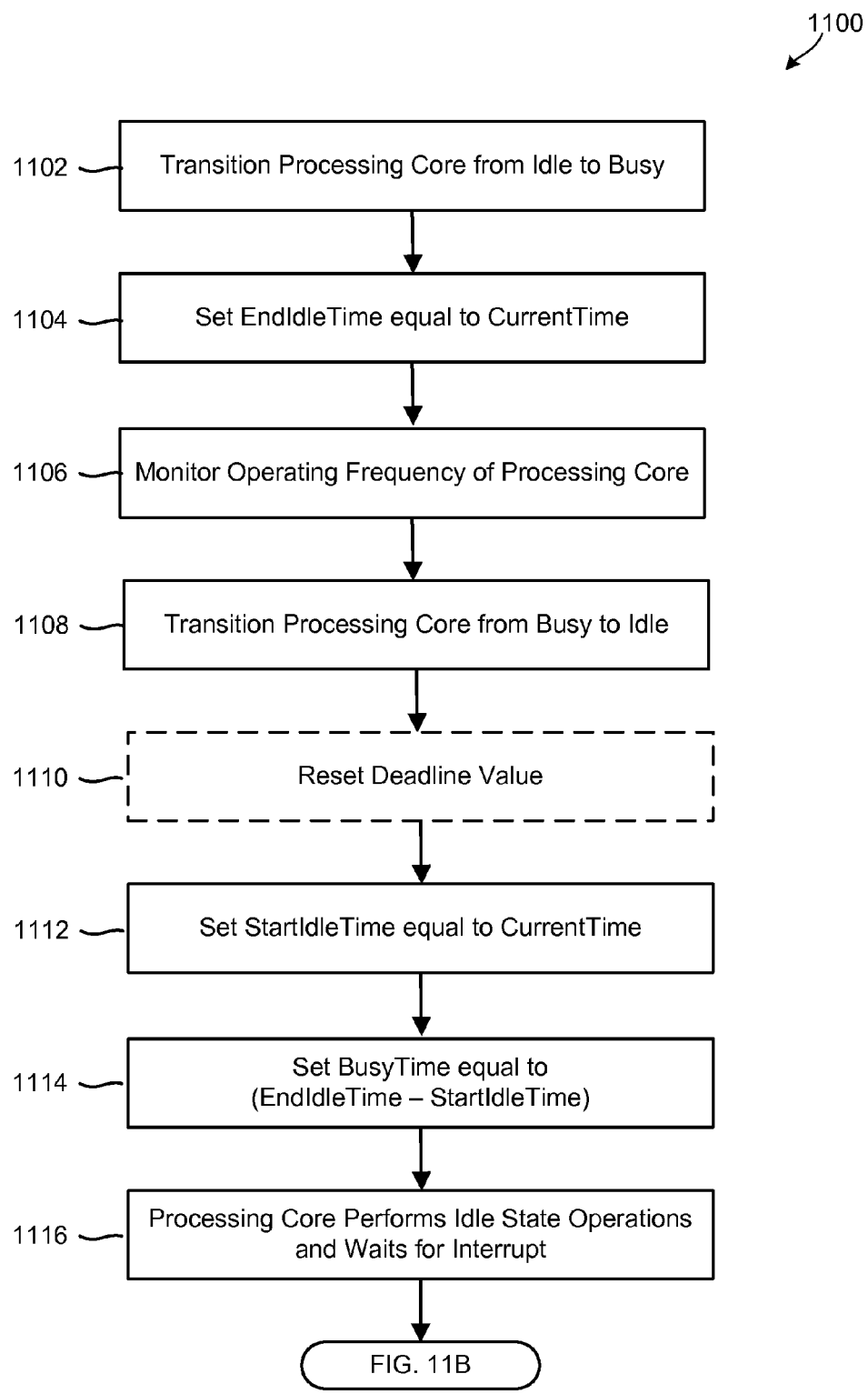
FIGS. 11A-B are process flow diagrams illustrating an aspect method of generating a performance guarantee.
Figure 11B:
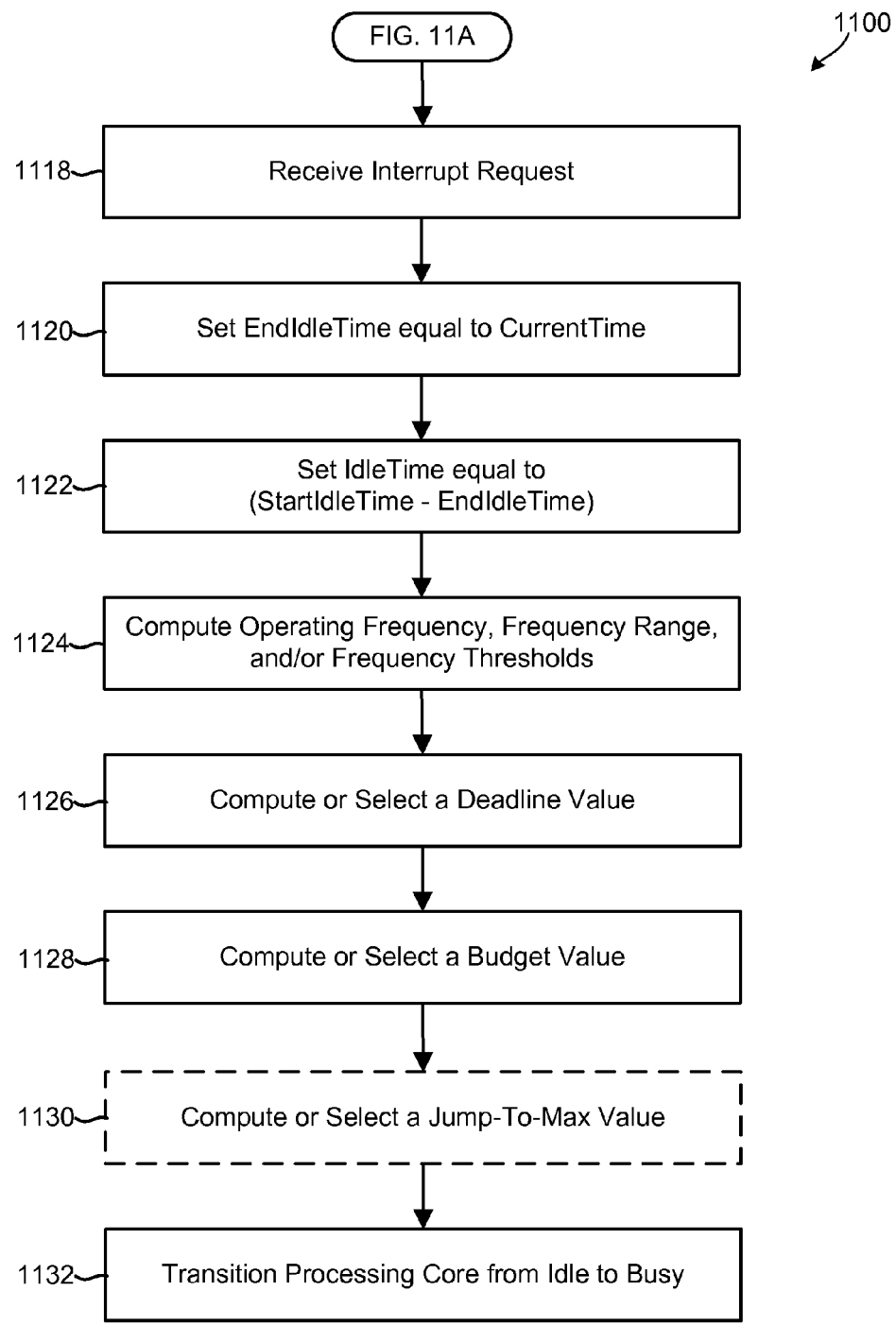

FIGS. 11A-B illustrate an aspect DCVS solution method 1100 of generating/computing a performance guarantee that ensures a processing core does not remain in a busy state for more than a predetermined amount of time above that which is required for that processing core to complete its pre-computed, predicted, and/or actual steady state workload (e.g., due to transient workloads, etc.). In various aspects, the operations of the DCVS solution may be performed by a thread executing on the processing core or on another processing core. In an aspect, one or more of the operations of the DCVS solution may be performed by an idle thread executing on the processing core.

In block 1102, a DCVS solution may cause a processing core to transition from an idle state to a busy state. In block 1104, the DCVS solution may set the value of an end idle time parameter (EndIdleTime) to be equal to a current time value (CurrentTime). Thus, the end idle time parameter (EndIdleTime) may store a value that is indicative of the time at which the processing core last exited the idle state.

In various aspects, the operations of blocks 1102 and 1104 may be performed sequentially, in parallel, and/or in any order. For example, in an aspect, the DCVS solution may set the value of an end idle time parameter (EndIdleTime) before transitioning the processing core from idle to busy. In another aspect, the DCVS solution may set the value of an end idle time parameter (EndIdleTime) after transitioning the processing core from idle to busy.

In block 1106, the DCVS solution may monitor the operating frequency or voltage of the processing core and make adjustments as necessary. In block 1108, the DCVS solution may cause the processing core to transition from the busy state to the idle state. In an aspect, the DCVS solution may transition the processing core to the idle state by commencing execution of an idle thread on the processing core. In an aspect, the DCVS solution may transition the processing core to the idle state after the processing core completes all the tasks associated with all its workloads.

In optional block 1110, the DCVS solution may set or reset an existing deadline value. As discussed above, a deadline value may be a performance guarantee value that is included in, or associated with, a performance guarantee. Additional details regarding the operations of setting, reset, and/or computing the deadline value are provided further below.

In block 1112, the DCVS solution may set the value of a start idle time parameter (StartIdleTime) to be equal to a current time value (CurrentTime). In block 1114, the DCVS solution may set the value of a busy time parameter (BusyTime) to be equal to the difference between the time when the processing core last exited a previous idle state (which may be represented by the end idle time parameter "EndIdleTime") and the time when the processing core entered the current idle state (which may be represented by the start idle time parameter "StartIdleTime"). Thus, the busy time parameter (BusyTime) may store a value that is indicative of a duration in which the processing core most recently remained in the busy state.

In block 1116, the DCVS solution may cause the processing core to perform various idle state operations, such as sleep operations, deep sleep operations, or software wait for interrupt operations. Accordingly, in block 1116, the DCVS solution (e.g., via the idle thread, operating system, etc.) may cause the processing core to enter a sleep state, a deep sleep state, a wait for interrupt state, etc.

In block 1118, the DCVS solution and/or idle thread may receive an interrupt request and/or otherwise determine that the processing core is to be transitioned from its current state to a busy state. This may be achieved by DCVS solution receiving a notification (e.g., from an operating system scheduler, controller, etc.) that tasks have been scheduled for execution on the processing core and/or scheduled tasks are ready for execution.

In block 1120, the DCVS solution may set the value of the end idle time parameter (EndIdleTime) to be equal to a current time value (CurrentTime). In block 1122, the DCVS solution may set the value of an idle time parameter (IdleTime) to be equal to a difference between the value of the StartIdleTime parameter and the value of the EndIdleTime parameter. Thus, the idle time parameter (IdleTime) may store a value indicative of the duration in which the processing core last remained the idle state.

In block 1124, the DCVS solution may compute an operating frequency, frequency range, and/or frequency thresholds within which the processing core is to operate. In an aspect, the DCVS solution may compute the frequency or frequency range based on the duration of time the processing core last remained in a busy state (e.g., BusyTime) and/or the duration of time the processing core last remained in the idle state (e.g., IdleTime). In an aspect, the DCVS solution may compute the operating frequency, frequency range, and/or frequency thresholds based on historical information, such as an average (or moving average) of the durations in which the processor previously remained in the busy and/or idle states (e.g., over a predetermined time period or time window). In an aspect, the DCVS solution may compute the operating frequency, frequency range, and/or frequency thresholds based on pulse trains. As discussed above, pulse trains may be generated based on a sampling of the busy and/or idle states, transitions between states, depth of run-queues, etc.

In block 1126, the DCVS solution may compute or select a deadline value. The deadline value may be a value that is indicative of a relative time after which the frequency of the processing core is to be set to be increased, either to a next higher frequency step or to the maximum frequency. In various aspects, the deadline value may computed based on configuration settings, driver inputs, the quantity and/or types of scheduled tasks, the predicted steady state workload, and/or the responsiveness requirements of the computing device. The deadline value may be determined based on static and/or dynamic values. For example, the deadline value may be determined based on a static configuration value, or based on the types of tasks (e.g., streaming 1080p video vs. streaming 720p video, etc.) scheduled to be performed on the processing core.

In an aspect, the deadline value may be inversely proportional to the responsiveness requirements of the computing device (i.e., the higher the responsiveness requirements, the shorter the deadline). In an aspect, the deadline value may be a time value that is a function of a current operating frequency of the processing core (e.g., 10 milliseconds at a frequency of 100 MHz, 20 milliseconds at a frequency of 200 MHz, 40 milliseconds at a frequency of 400 MHz, etc.).

In block 1128, the DCVS solution may compute or select a budget value. The budget value may be a value that is indicative of an amount of time in which the processing core may remain in the active or busy state without exceeding the sum of the deadline value and the time determined to be required for the processing core to complete its steady state workload requirements. In an aspect, the budget value may be a time value that is a function of a current operating frequency of the processing core (e.g., 10 milliseconds at a frequency of 100 MHz, 20 milliseconds at a frequency of 200 MHz, 40 milliseconds at a frequency of 400 MHz, etc.).

In various aspects, the budget value may computed based on the deadline value, a plurality of frequency levels or steps, the maximum processor frequency, a steady state processor frequency, etc. In an aspect, the budget value may an effective transient budget and/or computed via any of the formulas discussed above.

In optional block 1130, the DCVS solution may compute a jump to max value. The jump-to-max value may be a value that is indicative of a relative time after which the frequency of the processing core is to be set the maximum processing frequency. In an aspect, the jump-to-max value may be computed by summing the value of the EndIdleTime parameter and the budge value.

In block 1132, the DCVS solution may transition the processing core from the idle state to a busy state. In an aspect, as part of block 1132, the DCVS solution may set the deadline value to be equal to the budget value. In various aspects, the DCVS solution may be configured to set the deadline value to be equal to the budget value each time the processing core transitions from idle to busy, enters an active or busy state (e.g., beings processing the workload, etc.) and/or exits an idle state (e.g., when an idle thread relinquishes the processing core, etc.).

Figure 12:
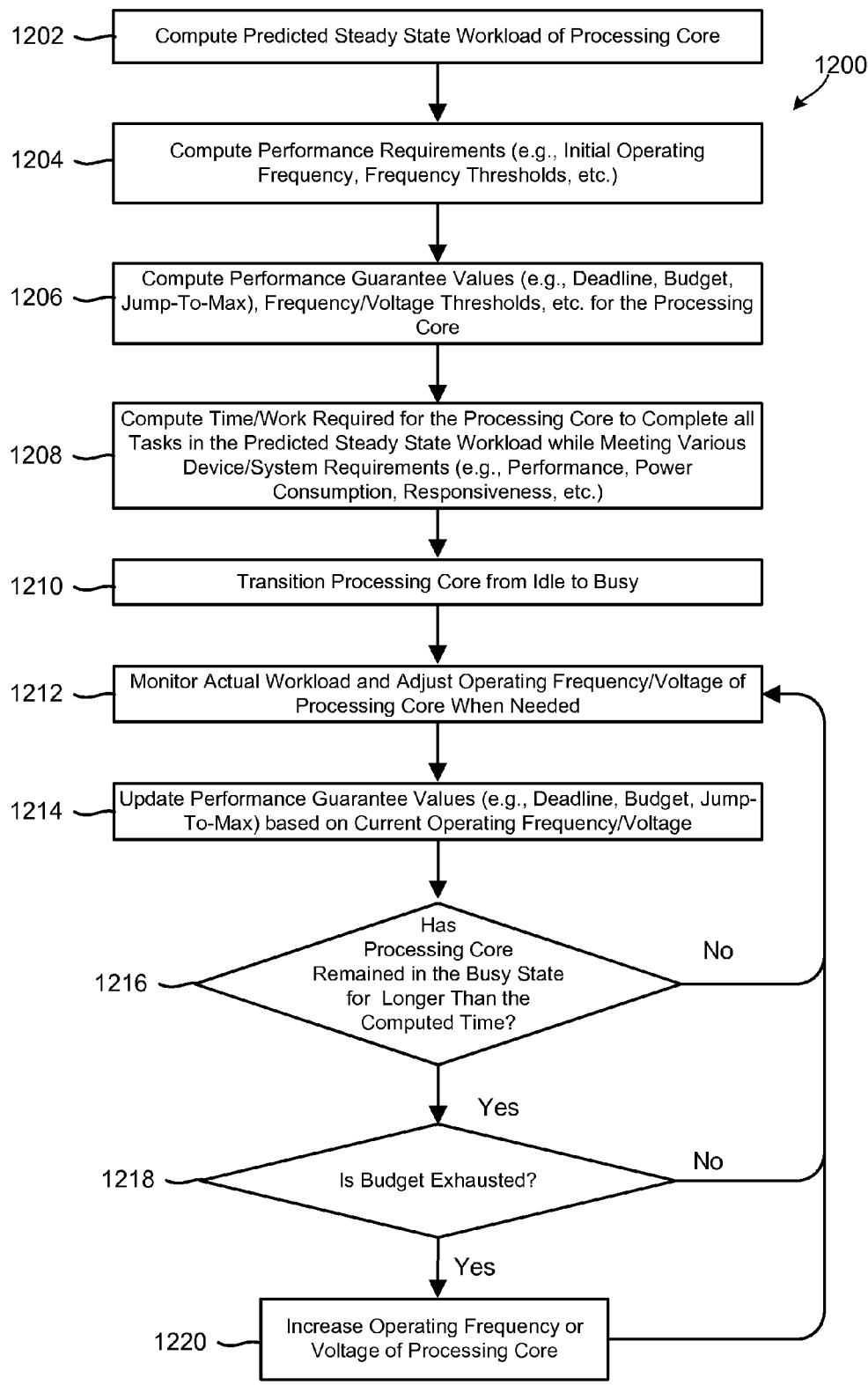
FIGS. 12-13 are process flow diagrams illustrating various aspect methods of enforcing a performance guarantee to ensure a processing core does not remain in a busy state for more than a predetermined amount of time above that which is required for that processing core to complete its pre-computed, predicted, and/or actual steady state workload.

FIG. 12 illustrates an aspect DCVS solution method 1200 of enforcing a performance guarantee to ensure a processing core does not remain in a busy state for more than a predetermined amount of time above that which is required for that processing core to complete its pre-computed, predicted, and/or actual steady state workload (e.g., due to the presence of transient workloads, etc.). In block 1202, a DCVS solution may compute the predicted steady state workload based on the scheduled tasks. In block 1204, the DCVS solution may compute various performance requirements for the processing core, such as frequency thresholds to meet the power consumption and/or responsiveness requirements of the computing device. The performance requirements (e.g., frequency thresholds, etc.) may be determined based on the steady state workload, historical information (e.g., amount of time previously spent in a busy state, etc.), processor characteristics, responsiveness requirements, etc.

In block 1206, the DCVS solution may compute and set the initial operating frequency and/or various performance guarantee values (e.g., deadline value, budget value, jump-to-max value, etc.). In block 1208, the DCVS solution may compute the amount of time or work (e.g., CPU cycles, instructions, etc.) required for the processing core to complete all the tasks in the steady state workload while meeting the various performance requirements.

In block 1210, the DCVS solution may transition the processing core from an idle state to a busy state so that the processing core runs at the computed initial operating frequency/voltage (or within the computed thresholds) and/or meets the various device or system requirements. In block 1212, the DCVS solution may monitor the actual workload and/or operating frequency of the processing core and adjust the frequency/voltage as necessary (e.g., in accordance with a default clock and voltage scaling algorithm). In optional block 1214, the DCVS solution may update the performance guarantee values based on the current operating frequency/voltage of the processing core.

In determination block 1216, the DCVS solution may determine whether the processing core has remained in the busy state longer than the computed time/work (i.e., the amount of time/work determined to be required for the processing core to complete all the tasks in the predicted steady state workload). When the DCVS solution determines that the processing core has not remained in the busy state for longer than the computed time/work (i.e., determination step 1216="No"), in block 1212, the DCVS solution may continue to monitor the actual workload/frequency and make adjustments when necessary.

When the DCVS solution determines that the processing core has remained in the busy state for a duration that is longer than the computed time/work (i.e., determination step 1216="Yes"), in determination block 1218, the DCVS solution may determine whether the budget has been exhausted. The DCVS solution may determine that the budget has been exhausted when the budget value equals zero and/or when the processing core has remained in the busy state for a duration (measured in either time or work) that is greater than or equal to the deadline value plus the computed time/work.

When the DCVS solution determines that the budget has not been exhausted (i.e., determination step 1218="No"), in block 1212, the DCVS solution may continue to monitor the actual workload/frequency and make adjustments as necessary. When the DCVS solution determines that the budget has been exhausted (i.e., determination step 1218="Yes"), in block 1220, the DCVS solution may increase the operating frequency/voltage of the processing core. In an aspect, the DCVS solution may increase operating frequency/voltage of the processing core to the maximum processor frequency in block 1220. In an aspect, the DCVS solution may increase operating frequency/voltage thresholds in block 1220. In an aspect, in block 1220, the DCVS solution may increase operating frequency/voltage of the processing core in steps.

Figure 13:
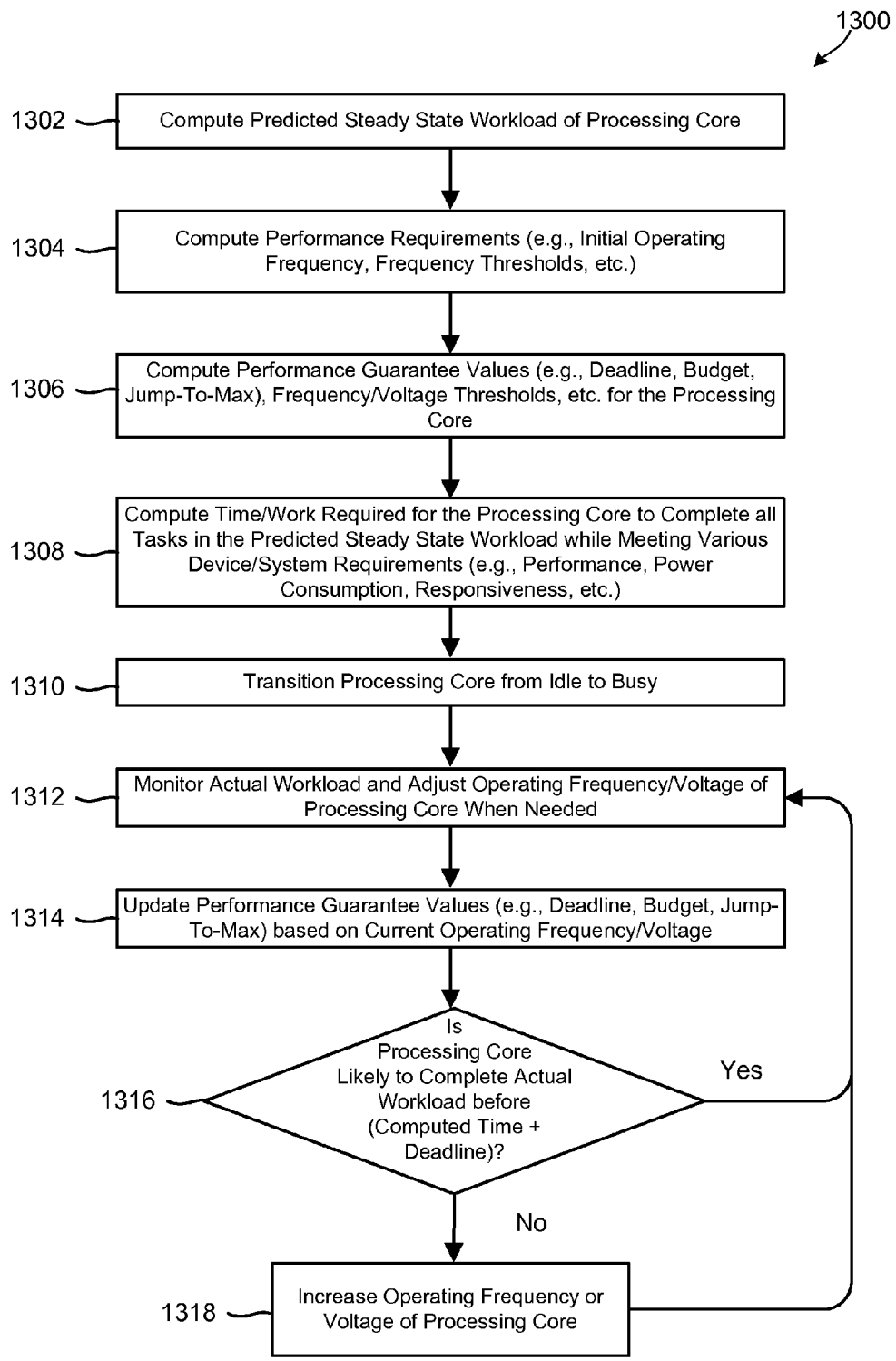

FIG. 13 illustrates another aspect DCVS solution method 1300 of enforcing a performance guarantee. In blocks 1302-1314, the DCVS solution may perform operations that are the same as, or similar to, the operations discussed above with respect to blocks 1202-1214 of FIG. 12. In determine block 1316, the DCVS solution may determine whether there is a high probably that the processing core will complete its current workload before the computed time (i.e., the amount of time determined to be required for the processing core to complete all the tasks in the predicted steady state workload) plus the deadline value (Computed Time+Deadline).

When the DCVS solution determines that the there is a high probably that the processing core will complete its current workload before the computed time plus the deadline value (i.e., determination step 1316="Yes"), in block 1312, the DCVS solution may continue to monitor the actual workload/frequency and make adjustments to the operating frequency/voltage as necessary.

When the DCVS solution determines that the there is not a high probably that the processing core will complete its current workload before the computed time value plus the deadline value (i.e., determination step 1316="No"), in block 1318, the DCVS solution may increase the operating frequency/voltage of the processing core. The operating frequency/voltage of the processing core may be increased to the maximum processor frequency or in steps.

Various aspects include methods of improving performance on a computing device having a processor, which may include determining a steady state workload of the processor, determining an amount of work required to perform the determined steady state workload on the processor, computing a performance guarantee value for the processor, transitioning the processor from an idle state to a busy state, performing dynamic clock and voltage scaling operations to scale a frequency of the processor based on an actual workload of the processor, updating the performance guarantee value based on the scaled frequency, determining whether the processor has remained in the busy state for a period greater than or equal to a sum of the determined amount of work and the performance guarantee value, and increasing the frequency of the processor when it is determined that the processor has remained in the busy state for a period greater than or equal to a sum of the determined amount of work and the performance guarantee value.

In an aspect, increasing the frequency of the processor when it is determined that the processor has remained in the busy state for a period greater than or equal to a sum of the determined amount of work and the performance guarantee value may include increasing the frequency of the processor to a maximum processor frequency. In a further aspect, increasing the frequency of the processor when it is determined that the processor has remained in the busy state for a period greater than or equal to a sum of the determined amount of work and the performance guarantee value may include increasing the frequency of the processor in steps. In a further aspect, the method may further include repeatedly performing the operations of updating the performance guarantee value based on the scaled frequency, determining whether the processor has remained in the busy state for a period greater than or equal to a sum of the determined amount of work and the performance guarantee value, and increasing the frequency of the processor when it is determined that the processor has remained in the busy state for a period greater than or equal to a sum of the determined amount of work and the performance guarantee value.

In a further aspect, computing a performance guarantee value for the processor may include computing a deadline value. In a further aspect, computing a performance guarantee value for the processor may include computing a budget value. In a further aspect, determining a steady state workload of the processor may include determining requirements of tasks scheduled to execute on the processor. In a further aspect, the method may include generating pulse trains by sampling transitions between the busy and idle states. In a further aspect, the operations of determining a steady state workload of the processor, determining an amount of work required to perform steady state workload on the processor, and computing a performance guarantee value for the processor are performed by a single thread. In a further aspect, the single thread executes on the processor. In a further aspect, the single thread executes on a second processor of the computing device.

Further aspects include a computing device having means for determining a steady state workload of the processor, means for determining an amount of work required to perform the determined steady state workload on the processor, means for computing a performance guarantee value for the processor, means for transitioning the processor from an idle state to a busy state, means for performing dynamic clock and voltage scaling operations to scale a frequency of the processor based on an actual workload of the processor, means for updating the performance guarantee value based on the scaled frequency, means for determining whether the processor has remained in the busy state for a period greater than or equal to a sum of the determined amount of work and the performance guarantee value, and means for increasing the frequency of the processor when it is determined that the processor has remained in the busy state for a period greater than or equal to a sum of the determined amount of work and the performance guarantee value.

In an aspect, means for increasing the frequency of the processor when it is determined that the processor has remained in the busy state for a period greater than or equal to a sum of the determined amount of work and the performance guarantee value may include means for increasing the frequency of the processor to a maximum processor frequency.

In a further aspect, means for increasing the frequency of the processor when it is determined that the processor has remained in the busy state for a period greater than or equal to a sum of the determined amount of work and the performance guarantee value may include means for increasing the frequency of the processor in steps. In a further aspect, the computing device may further include means for repeatedly performing the operations of updating the performance guarantee value based on the scaled frequency, determining whether the processor has remained in the busy state for a period greater than or equal to a sum of the determined amount of work and the performance guarantee value, and increasing the frequency of the processor when it is determined that the processor has remained in the busy state for a period greater than or equal to a sum of the determined amount of work and the performance guarantee value.

In a further aspect, means for computing a performance guarantee value for the processor may include means for computing a deadline value. In a further aspect, means for computing a performance guarantee value for the processor may include means for computing a budget value. In a further aspect, means for determining a steady state workload of the processor may include means for determining requirements of tasks scheduled to execute on the processor. In a further aspect, the computing device may include means for generating pulse trains by sampling transitions between the busy and idle states.

In a further aspect, the computing device may include means for accomplishing the operations of determining a steady state workload of the processor, determining an amount of work required to perform steady state workload on the processor, and computing a performance guarantee value for the processor via a single thread. In a further aspect, the computing device may include means for executing the single thread on the processor. In a further aspect, the computing device may include means for executing the single thread on a second processor of the computing device.

Further aspects include a computing device that may include a processor configured with processor-executable instructions to perform operations that may include a first processor configured with processor-executable instructions to perform operations including determining a steady state workload of a second processor, determining an amount of work required to perform the determined steady state workload on the second processor, computing a performance guarantee value for the second processor, transitioning the second processor from an idle state to a busy state, performing dynamic clock and voltage scaling operations to scale a frequency of the second processor based on an actual workload of the second processor, updating the performance guarantee value based on the scaled frequency, determining whether the second processor has remained in the busy state for a period greater than or equal to a sum of the determined amount of work and the performance guarantee value, and increasing the frequency of the second processor when it is determined that the second processor has remained in the busy state for a period greater than or equal to a sum of the determined amount of work and the performance guarantee value.

In an aspect, the first processor may be configured with processor-executable instructions such that increasing the frequency of the second processor when it is determined that the second processor has remained in the busy state for a period greater than or equal to a sum of the determined amount of work and the performance guarantee value may include increasing the frequency of the second processor to a maximum processor frequency.

In a further aspect, the first processor may be configured with processor-executable instructions such that increasing the frequency of the second processor when it is determined that the second processor has remained in the busy state for a period greater than or equal to a sum of the determined amount of work and the performance guarantee value may include increasing the frequency of the second processor in steps.

In a further aspect, the first processor may be further configured with processor-executable instructions to repeatedly perform the operations of updating the performance guarantee value based on the scaled frequency, determining whether the second processor has remained in the busy state for a period greater than or equal to a sum of the determined amount of work and the performance guarantee value, and increasing the frequency of the second processor when it is determined that the second processor has remained in the busy state for a period greater than or equal to a sum of the determined amount of work and the performance guarantee value. In a further aspect, the first processor may be configured with processor-executable instructions such that computing a performance guarantee value for the second processor may include computing a deadline value.

In a further aspect, the first processor may be configured with processor-executable instructions such that computing a performance guarantee value for the second processor may include computing a budget value. In a further aspect, the first processor may be configured with processor-executable instructions such that determining a steady state workload of the second processor may include determining requirements of tasks scheduled to execute on the second processor. In a further aspect, the first processor may be configured with processor-executable instructions to perform operations further including generating pulse trains by sampling transitions between the busy and idle states.

In a further aspect, the first processor may be configured with processor-executable instructions such that the operations of determining a steady state workload of the second processor, determining an amount of work required to perform steady state workload on the second processor, and computing a performance guarantee value for the second processor are performed by a single thread. In a further aspect, the first processor may be configured with processor-executable instructions such that the single thread may be executed on the first processor. In a further aspect, the first processor may be configured with processor-executable instructions such that accomplishing the operations of determining a steady state workload of the second processor, determining an amount of work required to perform steady state workload on the second processor, and computing a performance guarantee value for the second processor may include executing the single tread on the second processor.

Further aspects include a non-transitory server-readable storage medium having stored thereon processor-executable instructions configured cause a computing device to perform operations that may include determining a steady state workload of a second processor, determining an amount of work required to perform the determined steady state workload on the second processor, computing a performance guarantee value for the second processor, transitioning the second processor from an idle state to a busy state, performing dynamic clock and voltage scaling operations to scale a frequency of the second processor based on an actual workload of the second processor, updating the performance guarantee value based on the scaled frequency, determining whether the second processor has remained in the busy state for a period greater than or equal to a sum of the determined amount of work and the performance guarantee value, and increasing the frequency of the second processor when it is determined that the second processor has remained in the busy state for a period greater than or equal to a sum of the determined amount of work and the performance guarantee value.

In an aspect, the stored processor-executable software instructions may be configured to cause a processor to perform operations such that increasing the frequency of the second processor when it is determined that the second processor has remained in the busy state for a period greater than or equal to a sum of the determined amount of work and the performance guarantee value may include increasing the frequency of the second processor to a maximum processor frequency.

In a further aspect, the stored processor-executable software instructions may be configured to cause a second processor to perform operations such that increasing the frequency of the second processor when it is determined that the second processor has remained in the busy state for a period greater than or equal to a sum of the determined amount of work and the performance guarantee value may include increasing the frequency of the second processor in steps, and repeatedly performing the operations of updating the performance guarantee value based on the scaled frequency, determining whether the second processor has remained in the busy state for a period greater than or equal to a sum of the determined amount of work and the performance guarantee value, and increasing the frequency of the second processor when it is determined that the second processor has remained in the busy state for a period greater than or equal to a sum of the determined amount of work and the performance guarantee value.

In a further aspect, the stored processor-executable software instructions may be configured to cause a processor to perform operations such that computing a performance guarantee value for the second processor may include computing a deadline value. In a further aspect, the stored processor-executable software instructions may be configured to cause a processor to perform operations such that computing a performance guarantee value for the second processor may include computing a budget value. In a further aspect, the stored processor-executable software instructions may be configured to cause a processor to perform operations such that determining a steady state workload of the second processor may include determining requirements of tasks scheduled to execute on the second processor. In a further aspect, the stored processor-executable software instructions may be configured to cause a processor to perform operations including generating pulse trains by sampling transitions between the busy and idle states.

In a further aspect, the stored processor-executable software instructions may be configured to cause a processor to perform operations such that the operations of determining a steady state workload of the second processor, determining an amount of work required to perform steady state workload on the second processor, and computing a performance guarantee value for the second processor are performed by a single thread. In a further aspect, the stored processor-executable software instructions may be configured to cause a processor to perform operations such that the single thread executes on the processor. In a further aspect, the stored processor-executable software instructions may be configured to cause a processor to perform operations such that the single thread executes on the second processor.

The various aspects provide a number of benefits, and may be implemented in laptops and other mobile devices in which performance, power consumption, and/or responsiveness are important. The various aspects may be implemented in server and personal computers to decrease energy and cooling costs for lightly loaded machines. Reducing the heat output allows the system cooling fans to be throttled down or turned off, reducing noise levels, and further decreasing power consumption. The various aspects may also be used for reducing heat in insufficiently cooled systems when the temperature reaches a certain threshold.

While the various aspects are described above for illustrative purposes in terms of processing cores, the aspect methods, systems, and executable instructions may be implemented in any system in which the methods enable recognition of and controlling of frequency or voltage. Further, the operations of scaling the frequency or voltage may be performed on any single or multiprocessor system.

Figure 14:
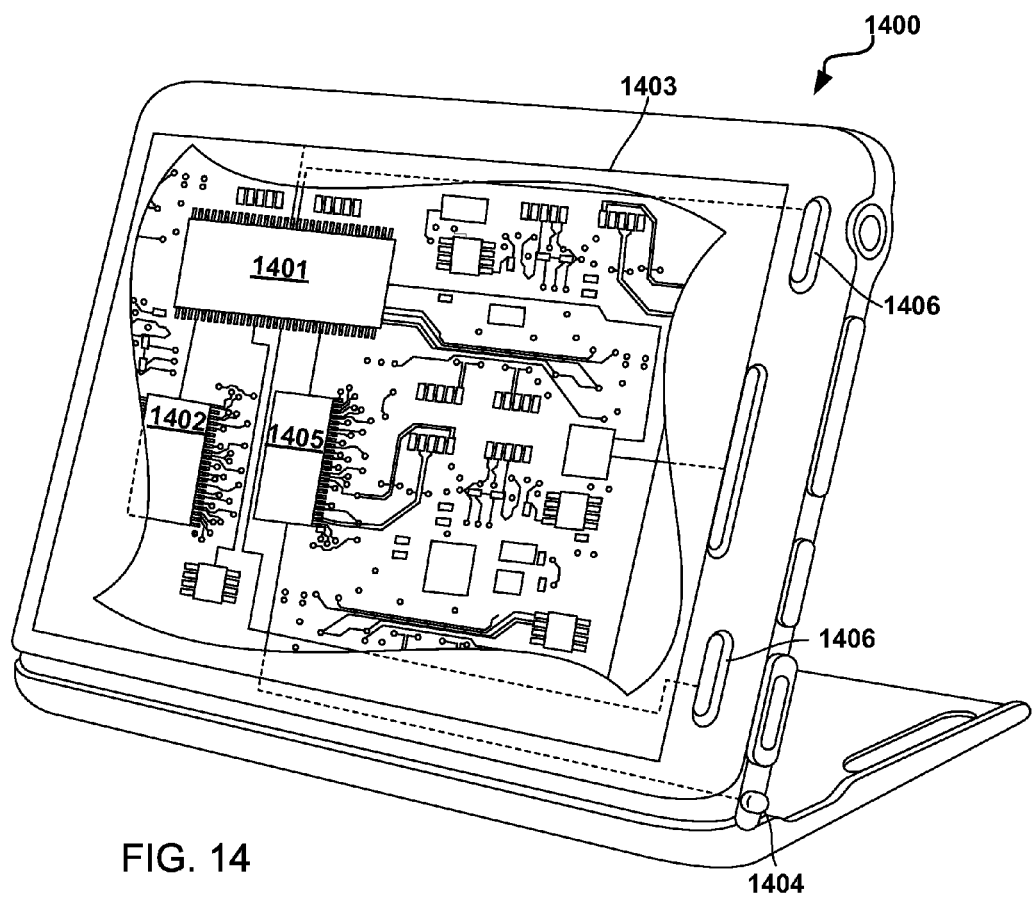
FIG. 14 is a component block diagram of a mobile device suitable for use in an aspect.

The various aspects may be implemented in a variety of portable or mobile computing devices, an example of which is illustrated in FIG. 14. The portable computing device 1400 may include a processing core 1401 coupled to memory 1402 and to a transceiver 1405. The transceiver 1405 may be coupled to an antenna 1404 for sending and receiving electromagnetic radiation. The portable computing device 1400 may also include a display 1403 (e.g., touch screen display) and menu selection buttons or rocker switches 1406 for receiving user inputs. In some portable computing device, multiple processors 1401 may be provided, such as one processor dedicated to wireless communication functions and one processor dedicated to running other applications.

Figure 15:
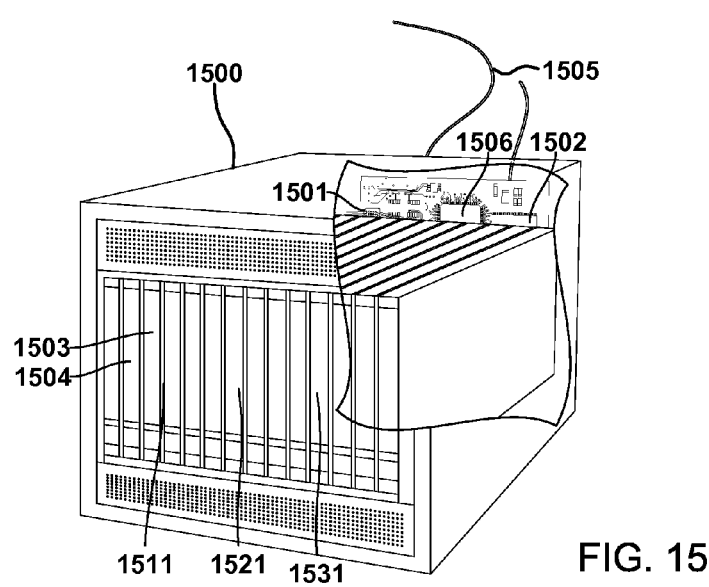
FIG. 15 is a component block diagram of a server device suitable for use in an aspect.

The various aspects may also be implemented on any of a variety of commercially available server devices, such as the server 1500 illustrated in FIG. 15. Such a server 1500 typically includes a processing core 1501, and may include multiple processor systems 1511, 1521, 1531, one or more of which may be or include multi-core processors. The processing core 1501 may be coupled to volatile memory 1502 and a large capacity nonvolatile memory, such as a disk drive 1503. The server 1500 may also include a floppy disc drive, compact disc (CD) or DVD disc drive 1506 coupled to the processing core 1501. The server 1500 may also include network access ports 1504 coupled to the processing core 1501 for establishing data connections with a network 1505, such as a local area network coupled to other broadcast system computers and servers.

Figure 16:
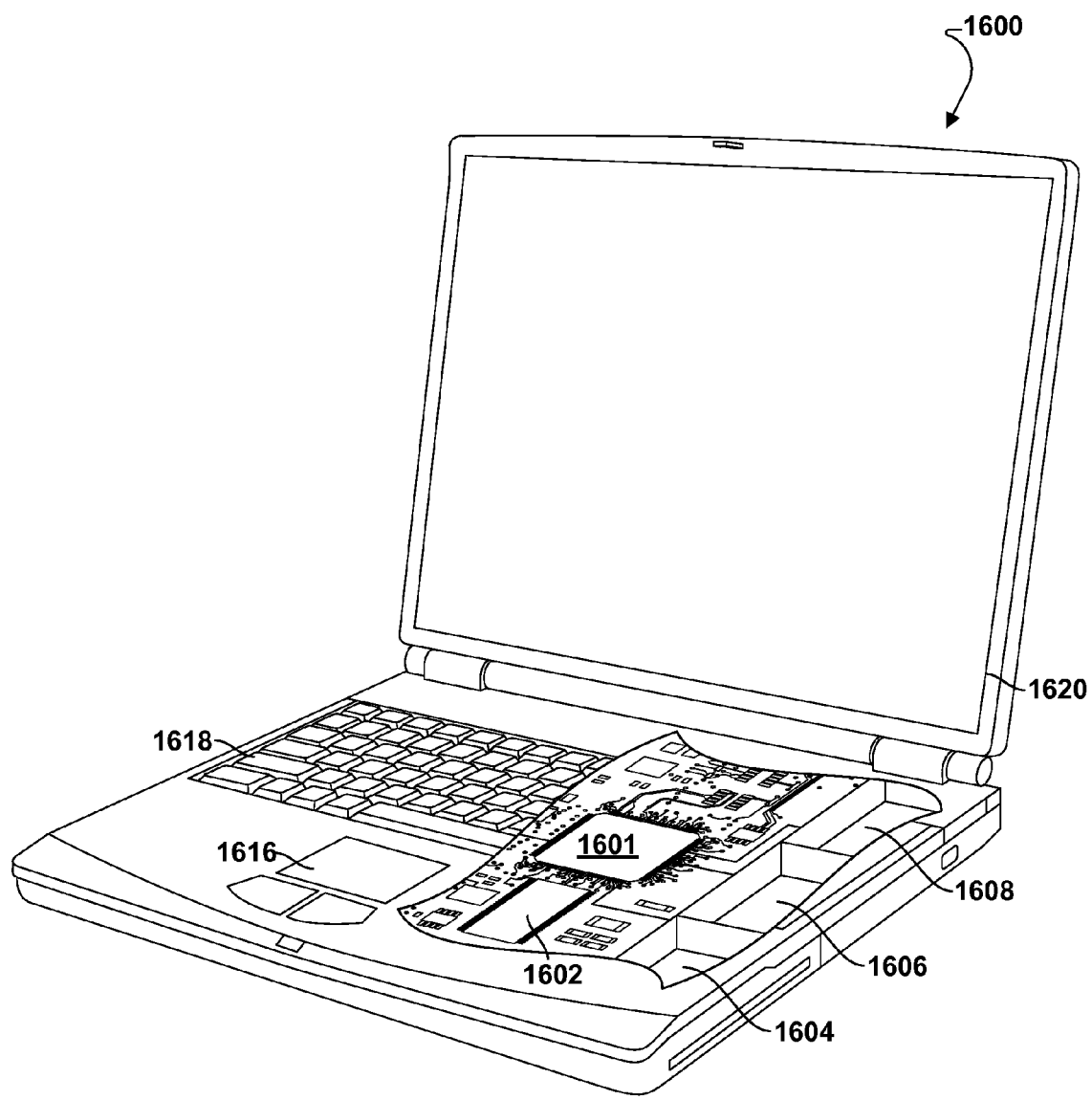
FIG. 16 is a component block diagram of a laptop computer device suitable for use in an aspect.

The aspects described above may also be implemented within a variety of personal computing devices, such as a laptop computer 1600 as illustrated in FIG. 16. A laptop computer 1600 may include a processing core 1601 coupled to volatile memory 1602 and a large capacity nonvolatile memory, such as a disk drive 1604 of Flash memory. The computer 1600 may also include a floppy disc drive 1606 and a compact disc (CD) drive 1608 coupled to the processing core 1601. The computer device 1600 may also include a number of connector ports coupled to the processing core 1601 for establishing data connections or receiving external memory devices, such as a USB, FireWire®, or Lightning® connector sockets, or other network connection circuits for coupling the processing core 1601 to a network or computer. In a notebook configuration, the computer housing includes the touchpad 1616, the keyboard 1618, and the display 1620 all coupled to the processing core 1601. Other configurations of computing device may include a computer mouse or trackball coupled to the processor (e.g., via a USB input) as are well known.

The processing core 1401, 1501, 1601 may be any programmable processor, microprocessor, microcomputer, multi-core processor, or multiple-processor chip that can be configured by software instructions (applications) to perform a variety of functions, including the functions and operations of the various aspects described herein. Typically, software applications may be stored in the internal memory 1402, 1502, 1602 before they are accessed and loaded into the processing core 1401, 1501, 1601. Each processing core 1401, 1501, 1601 may include internal memory sufficient to store the application software instructions. In some computing devices, additional memory chips (e.g., a Secure Data (SD) card) may be plugged into the computing device and coupled to the processing core 1401, 1501, 1601. The internal memory 1402, 1502, 1602 may be a volatile or nonvolatile memory, such as flash memory, or a mixture of both. For the purposes of this description, a general reference to memory refers to all memory accessible by the processing core 1401, 1501, 1601, including internal memory 1402, removable memory plugged into the mobile device, and memory within the processing core 1401.

The processing core 1501, 1601, 1710 may include internal memory sufficient to store the application software instructions. In many devices the internal memory may be a volatile or nonvolatile memory, such as flash memory, or a mixture of both. For the purposes of this description, a general reference to memory refers to memory accessible by the processor 1501, 1601, 1710 including internal memory or removable memory plugged into the device and memory within the processing core 1501, 1601, 1710 itself.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more processor-executable instructions or code on a non-transitory computer-readable storage medium. The steps of a method or algorithm disclosed herein may be embodied in a processor-executable software module which may reside on a tangible or non-transitory computer-readable storage medium. Non-transitory computer-readable storage media may be any available storage media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also can be included within the scope of non-transitory computer-readable media. Additionally, the operations of a method or algorithm may reside as one or any combination or set of codes and/or instructions on a non-transitory machine readable medium and/or non-transitory computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of improving performance on a computing device having a processor, the method comprising:
   determining a steady state workload of the processor;
   determining an amount of work required to perform the determined steady state workload on the processor;
   computing a performance guarantee value for the processor;

transitioning the processor from an idle state to a busy state;

performing dynamic clock and voltage scaling operations to scale a frequency of the processor based on an actual workload of the processor;

updating the performance guarantee value based on the scaled frequency;

determining whether the processor has remained in the busy state for a period greater than or equal to a sum of the determined amount of work and the performance guarantee value; and increasing the frequency of the processor when it is determined that the processor has remained in the busy state for a period greater than or equal to a sum of the determined amount of work and the performance guarantee value.

2. The method of claim 1, wherein increasing the frequency of the processor when it is determined that the processor has remained in the busy state for a period greater than or equal to a sum of the determined amount of work and the performance guarantee value comprises:

increasing the frequency of the processor to a maximum processor frequency.

3. The method of claim 1, wherein increasing the frequency of the processor when it is determined that the processor has remained in the busy state for a period greater than or equal to a sum of the determined amount of work and the performance guarantee value comprises increasing the frequency of the processor in steps, the method further comprising repeatedly performing the operations of:

updating the performance guarantee value based on the scaled frequency;

determining whether the processor has remained in the busy state for a period greater than or equal to a sum of the determined amount of work and the performance guarantee value; and increasing the frequency of the processor when it is determined that the processor has remained in the busy state for a period greater than or equal to a sum of the determined amount of work and the performance guarantee value.

4. The method of claim 1, wherein computing a performance guarantee value for the processor comprises computing a deadline value.

5. The method of claim 1, wherein computing a performance guarantee value for the processor comprises computing a budget value.

6. The method of claim 1, wherein determining a steady state workload of the processor comprises determining requirements of tasks scheduled to execute on the processor.

7. The method of claim 1, further comprising:
generating pulse trains by sampling transitions between the busy and idle states.

8. The method of claim 1, wherein the operations of determining a steady state workload of the processor, determining an amount of work required to perform steady state workload on the processor, and computing a performance guarantee value for the processor are performed by a single thread.

9. The method of claim 8, wherein the single thread executes on the processor.

10. The method of claim 8, wherein the single thread executes on a second processor of the computing device.

11. A computing device, comprising:
a processor;
means for determining a steady state workload of the processor;

means for determining an amount of work required to perform the determined steady state workload on the processor;

means for computing a performance guarantee value for the processor;

means for transitioning the processor from an idle state to a busy state;

means for performing dynamic clock and voltage scaling operations to scale a frequency of the processor based on an actual workload of the processor;

means for updating the performance guarantee value based on the scaled frequency;

means for determining whether the processor has remained in the busy state for a period greater than or equal to a sum of the determined amount of work and the performance guarantee value; and means for increasing the frequency of the processor when it is determined that the processor has remained in the busy state for a period greater than or equal to a sum of the determined amount of work and the performance guarantee value.

12. The computing device of claim 11, wherein means for increasing the frequency of the processor when it is determined that the processor has remained in the busy state for a period greater than or equal to a sum of the determined amount of work and the performance guarantee value comprises:

means for increasing the frequency of the processor to a maximum processor frequency.

13. The computing device of claim 11, wherein means for increasing the frequency of the processor when it is determined that the processor has remained in the busy state for a period greater than or equal to a sum of the determined amount of work and the performance guarantee value comprises means for increasing the frequency of the processor in steps, the computing device further comprising means for repeatedly performing the operations of:

updating the performance guarantee value based on the scaled frequency;

determining whether the processor has remained in the busy state for a period greater than or equal to a sum of the determined amount of work and the performance guarantee value; and increasing the frequency of the processor when it is determined that the processor has remained in the busy state for a period greater than or equal to a sum of the determined amount of work and the performance guarantee value.

14. The computing device of claim 11, wherein means for computing a performance guarantee value for the processor comprises means for computing a deadline value.

15. The computing device of claim 11, wherein means for computing a performance guarantee value for the processor comprises means for computing a budget value.

16. The computing device of claim 11, wherein means for determining a steady state workload of the processor comprises means for determining requirements of tasks scheduled to execute on the processor.

17. The computing device of claim 11, further comprising:
means for generating pulse trains by sampling transitions between the busy and idle states.

18. The computing device of claim 11, further comprising means for accomplishing the operations of determining a steady state workload of the processor, determining an amount of work required to perform steady state workload on the processor, and computing a performance guarantee value for the processor via a single thread.

19. The computing device of claim 18, further comprising means for executing the single thread on the processor.

20. The computing device of claim 18, further comprising means for executing the single thread on a second processor of the computing device.

21. A computing device, comprising:
a first processor configured with processor-executable instructions to perform operations comprising:
determining a steady state workload of a second processor;
determining an amount of work required to perform the determined steady state workload on the second processor;
computing a performance guarantee value for the second processor;
transitioning the second processor from an idle state to a busy state;
performing dynamic clock and voltage scaling operations to scale a frequency of the second processor based on an actual workload of the second processor;
updating the performance guarantee value based on the scaled frequency;
determining whether the second processor has remained in the busy state for a period greater than or equal to a sum of the determined amount of work and the performance guarantee value; and
increasing the frequency of the second processor when it is determined that the second processor has remained in the busy state for a period greater than or equal to a sum of the determined amount of work and the performance guarantee value.

22. The computing device of claim 21, wherein the first processor is configured with processor-executable instructions such that increasing the frequency of the second processor when it is determined that the second processor has remained in the busy state for a period greater than or equal to a sum of the determined amount of work and the performance guarantee value comprises:
increasing the frequency of the second processor to a maximum processor frequency.

23. The computing device of claim 21,
wherein the first processor is configured with processor-executable instructions such that increasing the frequency of the second processor when it is determined that the second processor has remained in the busy state for a period greater than or equal to a sum of the determined amount of work and the performance guarantee value comprises increasing the frequency of the second processor in steps, and
wherein the first processor is further configured with processor-executable instructions to repeatedly perform the operations of:
updating the performance guarantee value based on the scaled frequency;
determining whether the second processor has remained in the busy state for a period greater than or equal to a sum of the determined amount of work and the performance guarantee value; and
increasing the frequency of the second processor when it is determined that the second processor has remained in the busy state for a period greater than or equal to a sum of the determined amount of work and the performance guarantee value.

24. The computing device of claim 21, wherein the first processor is configured with processor-executable instructions such that computing a performance guarantee value for the second processor comprises computing a deadline value.

25. The computing device of claim 21, wherein the first processor is configured with processor-executable instructions such that computing a performance guarantee value for the second processor comprises computing a budget value.

26. The computing device of claim 21, wherein the first processor is configured with processor-executable instructions such that determining a steady state workload of the second processor comprises determining requirements of tasks scheduled to execute on the second processor.

27. The computing device of claim 21, wherein the first processor is configured with processor-executable instructions to perform operations further comprising:
generating pulse trains by sampling transitions between the busy and idle states.

28. The computing device of claim 21, wherein the first processor is configured with processor-executable instructions such that the operations of determining a steady state workload of the second processor, determining an amount of work required to perform steady state workload on the second processor, and computing a performance guarantee value for the second processor are performed by a single thread.

29. The computing device of claim 28, wherein the first processor is configured with processor-executable instructions such that the single thread is executed on the first processor.

30. The computing device of claim 28, wherein the first processor is configured with processor-executable instructions such that accomplishing the operations of determining a steady state workload of the second processor, determining an amount of work required to perform steady state workload on the second processor, and computing a performance guarantee value for the second processor comprises executing the single thread on the second processor.

31. A non-transitory computer readable storage medium having stored thereon processor-executable software instructions configured to cause a first processor to perform operations comprising:
determining a steady state workload of a second processor;
determining an amount of work required to perform the determined steady state workload on the second processor;
computing a performance guarantee value for the second processor;
transitioning the second processor from an idle state to a busy state;
performing dynamic clock and voltage scaling operations to scale a frequency of the second processor based on an actual workload of the second processor;
updating the performance guarantee value based on the scaled frequency;
determining whether the second processor has remained in the busy state for a period greater than or equal to a sum of the determined amount of work and the performance guarantee value; and
increasing the frequency of the second processor when it is determined that the second processor has remained in the busy state for a period greater than or equal to a sum of the determined amount of work and the performance guarantee value.

32. The non-transitory computer readable storage medium of claim 31, wherein the stored processor-executable software instructions are configured to cause the first processor to perform operations such that increasing the frequency of the second processor when it is determined that the second processor has remained in the busy state for a period greater than or equal to a sum of the determined amount of work and the performance guarantee value comprises:

increasing the frequency of the second processor to a maximum processor frequency.

33. The non-transitory computer readable storage medium of claim 31, wherein the stored processor-executable software instructions are configured to cause the first processor to perform operations such that increasing the frequency of the second processor when it is determined that the second processor has remained in the busy state for a period greater than or equal to a sum of the determined amount of work and the performance guarantee value comprises increasing the frequency of the second processor in steps, and repeatedly performing the operations of:
   updating the performance guarantee value based on the scaled frequency;
   determining whether the second processor has remained in the busy state for a period greater than or equal to a sum of the determined amount of work and the performance guarantee value; and
   increasing the frequency of the second processor when it is determined that the second processor has remained in the busy state for a period greater than or equal to a sum of the determined amount of work and the performance guarantee value.

34. The non-transitory computer readable storage medium of claim 31, wherein the stored processor-executable software instructions are configured to cause the first processor to perform operations such that computing a performance guarantee value for the second processor comprises computing a deadline value.

35. The non-transitory computer readable storage medium of claim 31, wherein the stored processor-executable software instructions are configured to cause the first processor to perform operations such that computing a performance guarantee value for the second processor comprises computing a budget value.

36. The non-transitory computer readable storage medium of claim 31, wherein the stored processor-executable software instructions are configured to cause the first processor to perform operations such that determining a steady state workload of the second processor comprises determining requirements of tasks scheduled to execute on the second processor.

37. The non-transitory computer readable storage medium of claim 31, wherein the stored processor-executable software instructions are configured to cause the first processor to perform operations comprising:
   generating pulse trains by sampling transitions between the busy and idle states.

38. The non-transitory computer readable storage medium of claim 31, wherein the stored processor-executable software instructions are configured to cause the first processor to perform operations such that the operations of determining a steady state workload of the second processor, determining an amount of work required to perform steady state workload on the second processor, and computing a performance guarantee value for the second processor are performed by a single thread.

39. The non-transitory computer readable storage medium of claim 38, wherein the stored processor-executable software instructions are configured to cause the first processor to perform operations such that the single thread executes on the first processor.

40. The non-transitory computer readable storage medium of claim 38, wherein the stored processor-executable software instructions are configured to cause the first processor to perform operations such that the single thread executes on the second processor.

* * * * *